United States Patent

Matsuo

[11] Patent Number: 5,966,189
[45] Date of Patent: Oct. 12, 1999

[54] ACTIVE MATRIX SUBSTRATE AND COLOR LIQUID CRYSTAL DISPLAY

[75] Inventor: Mutsumi Matsuo, Tokyo, Japan

[73] Assignee: Seiko Epson Corporation, Tokyo, Japan

[21] Appl. No.: 09/064,007

[22] Filed: Apr. 22, 1998

Related U.S. Application Data

[62] Continuation of application No. 08/919,111, Aug. 28, 1997, which is a continuation of application No. 08/545,608, filed as application No. PCT/JP95/00231, Feb. 17, 1995.

[30] Foreign Application Priority Data

Feb. 17, 1994 [JP] Japan .................................. 6-20483

[51] Int. Cl.$^6$ .................................................. G02F 1/1343
[52] U.S. Cl. .................................................. 349/38; 349/39
[58] Field of Search .............................. 349/38, 39, 42, 349/187

[56] References Cited

U.S. PATENT DOCUMENTS

| | | | |
|---|---|---|---|
| 4,834,507 | 5/1989 | Kato et al. | 349/145 |
| 4,936,656 | 6/1990 | Yamashita et al. | 349/8 |
| 4,965,565 | 10/1990 | Noguchi | 345/93 |
| 5,151,689 | 9/1992 | Kabuto et al. | 345/103 |
| 5,446,564 | 8/1995 | Mawatari et al. | 349/116 |
| 5,446,568 | 8/1995 | Nakazawa et al. | 349/42 |
| 5,471,329 | 11/1995 | Nakajima et al. | 349/54 |
| 5,506,707 | 7/1994 | Segawa | 349/139 |
| 5,515,187 | 5/1996 | Nakamura et al. | 349/42 |
| 5,528,396 | 6/1996 | Someya et al. | 349/43 |
| 5,535,028 | 7/1996 | Bae et al. | 349/145 |

FOREIGN PATENT DOCUMENTS

| | | |
|---|---|---|
| 1-169433 | 4/1989 | Japan . |
| 1-169433 | 7/1989 | Japan . |
| 3-64046 | 3/1991 | Japan . |
| 4-184323 | 1/1992 | Japan . |
| 4-184323 | 7/1992 | Japan . |

Primary Examiner—William L. Sikes
Assistant Examiner—Toan Ton
Attorney, Agent, or Firm—Oliff & Berridge, PLC

[57] ABSTRACT

A set of pixel regions (P11, P12, P13) having a pixel electrode (12) corresponding to red, green or blue as one unit is arranged periodically in the X direction, and the delta arrangement is constituted by displacing the pixel arrays from each other by a ½ period at odd-numbered lines and even-numbered lines in the Y direction. By connecting only the pixel electrode (12) of pixel regions (P12, P22, P32) corresponding to the same color with the same source line (S2), the pixel regions (P12, P22, P32) are placed alternately right and left of the source line (S2). Among pixel regions (P11, P12, P13, ...) in the X direction, the relative position of a TFT (11), the pixel electrode (12), a first electrode (C1) and a second electrode (C2) of storage capacitors CS is the same. Among pixel regions (P12, P22, P32, ...) in the Y direction along source lines (S1, S2, S3, ...), although the relative position of the TFT (11) and the pixel electrode (12) is reversed right and left at each line, the relative position of the first electrode (C1) and the second electrode (C2) of the storage capacitors CS is the same.

3 Claims, 16 Drawing Sheets

| $P\_nm$ | | | | | |
|---|---|---|---|---|---|
| R | G | B | R | G | B |
| B | R | G | B | R | G |
| R | G | B | R | G | B |
| B | R | G | B | R | G |
| R | G | B | R | G | B |

FIG.13

ACTIVE MATRIX SUBSTRATE AND COLOR LIQUID CRYSTAL DISPLAY

This is a Continuation of application Ser. No. 08/919,111 filed Aug. 28, 1997, which in turn is a Continuation of application Ser. No. 08/545,608 filed Apr. 3, 1996, now abandoned, which was a U.S. National Stage Application of PCT International Application PCT/JP/00231 filed Feb. 17, 1995. The entire disclosure of the prior applications is hereby incorporated by reference herein in its entirety.

TECHNICAL FIELD

The present invention relates to an element structure of an active matrix substrate used in a liquid crystal display, and more particularly to the structure of a storage capacitor. Furthermore, the present invention relates to the structure of a color liquid crystal display making use of the active matrix substrate.

BACKGROUND ART

FIG. 1 shows a basic structure of a color liquid crystal display using an active matrix substrate. In FIG. 1, on the surface of a substrate 10 are gate lines G0, G1, G2, . . . running in the X direction, source lines S1, S2, S3, . . . running in the Y direction, a plurality of pixel electrodes 12 placed in the positions corresponding to the intersections of the source lines S1, S2, S3, . . . and the gate lines G1, G2, G3, . . . , and a thin film transistor 11 (hereinafter "TFT") connected with each of the pixel electrodes.

In a selection period, that is, a period in which the TFT 11 is on by the signals from the gate lines G1, G2, G3, . . . , the picture signals provided by the source lines S1, S2, S3, . . . are written in a liquid-crystal-capacitance portion CLC consisting of a common electrode 26 formed on an opposite substrate 20, a pixel electrode 12, and liquid crystal 30 encapsulated between the electrodes 26 and 12. In a non-selection period, that is, a period in which the TFT 11 is off, the picture signals written in the liquid-crystal-capacitance portion CLC in the selection period are retained.

Note that in order to achieve a high-quality display, the storage characteristics in the non-selection period need to be good. For that purpose, it will be effective to set up a storage capacitor CS electrically parallel to the liquid-crystal-capacitance portion CLC. As to the storage capacitor CS, it has been proposed that the storage capacitor CS be established between the adjacent gate line and the pixel electrode 12, or that the storage capacitor CS be established between a storage line (not shown in FIG. 1) separately formed and the pixel electrode 12.

The storage capacitor CS formed as was described above, the pixel electrode 12, the TFT 11, and other accompanying wirings and others constitute pixel regions P11, P12, P13 . . . Note that although in FIG. 1 there is no pixel region between the pixel region P11 and a pixel region P31, there can be a pixel region for blue or a dummy pixel region in the area in question.

The opposite substrate 20 has a color filter 21. The color filter 21 generally consists of a red filter R, a green filter G and a blue filter B. A set of the red filter R, the green filter G and the blue filter B as one unit is repeatedly placed in the display area. As the arrangements of the color filter 21, there are a stripe arrangement, a mosaic arrangement or a delta arrangement. FIG. 12 shows a color arrangement pattern according to the delta arrangement, and FIG. 13 shows an example of a color arrangement pattern according to the mosaic arrangement. The delta arrangement or the mosaic arrangement is more advantageous than the stripe arrangement in that a more delicate picture can be obtained than according to the stripe arrangement because each of the color elements is dispersed uniformly in the display area.

FIG. 3A of Japanese Patent Publication No. TOKUKOU-HEI 3-64046 and others disclose a liquid crystal display making use of the delta arrangement, and FIGS. 8C to 8F of the same publication and others disclose a liquid crystal display making use of the mosaic arrangement.

In the liquid crystal display using the delta arrangement disclosed in the above-mentioned publication, as shown in FIG. 14, a set of three pixel regions P21, P22, and P23 corresponding to the red filter R, the green filter G, and the blue filter B as one unit is placed periodically in the X direction. Note that the pixel regions P21, P22, and P23 in a pixel array at an even-numbered line are displaced from the pixel regions P11, P12, and P13 or the pixel regions P31, P32, and P33 in a pixel array at an odd-numbered line by a distance corresponding to a ½ period of the above-mentioned one unit. Accordingly, between the pixel array at an odd-numbered line and that at an even-numbered line, the center of the pixel regions P11, P12, P13, . . . are displaced right and left by 1.5 pixel pitches.

The pixel region P21 will be explained as an example, because each of the pixel regions has the same basic structure. In the pixel region P21, a source region 111 of the TFT 11 is connected with a source line S1, a gate electrode 113 is connected with a gate line G2, and a drain region 112 is connected with a pixel electrode 12.

In the pixel region P21, a first electrode C1 electrically connected with the drain region 112 of the TFT 11 and the pixel electrode 12, and a second electrode C2 projecting in the Y direction from a adjacent gate line G1 are formed. The first electrode C1 is usually made of a doped silicon film. The first electrode C1 and the second electrode C2 are, as described below, opposed across a dielectric film. The storage capacitor CS is formed as described above between the pixel electrode 12 and the adjacent gate line G1.

Since each of the source lines S1, S2, S3, . . . extends with a crank-like shape in the Y direction, and does not require a complicated color changeover circuit to supply a plurality of color signals with the same source line at appropriate timing, only the pixel electrode 12 in the pixel region corresponding to the same color is connected with the same source line through the TFT 11. Accordingly, the same source line has the pixel regions corresponding to the same color alternately on both sides of the source line at each line. The source line S2, for instance, has pixel regions P12, P22, P32, . . . corresponding to green alternately on both sides of the source line S2. And necessarily, the position of the TFT 11 and the source line is reversed at each line.

As a result, while as to the pixel regions P11, P12, P13, . . . in the X direction along the gate lines G1, G2, G3, . . . , the relative position of the TFT 11, the pixel electrode 12 and the storage capacitor CS (the first electrode C1 and the second electrode C2) is the same, as to the pixel regions P12, P22, P32, . . . in the Y direction along the source line S2, the relative position of the TFT 11, the pixel electrode 12 and the storage capacitor CS is symmetrical horizontally at every line. For example, comparing the pixel regions P11, P12, P13, . . . connected with the gate line G1 with the pixel regions P21, P22, P23, . . . connected with the gate line G2, the relative position of the TFT 11, the pixel electrode 12 and the storage capacitor CS is symmetrical horizontally.

The manufacturing method of the active matrix substrate with the above-mentioned structure will be briefly explained with reference to FIG. 15. FIGS. 15(A), (B) and (C) are a I–I' sectional view, a II–II' sectional view, and a III–III' sectional view of FIG. 14, respectively.

In FIG. 15(A), after a polycrystalline silicon thin film is formed on the substrate 10, a polycrystalline silicon thin film 110 is formed which constitutes an active region of the TFT 11 and the first electrode C1 of the storage capacitor CS by the patterning according to photolithography.

Then a gate oxide 114 and a dielectric film C3 of the storage capacitor CS are formed by thermal oxidation of the polycrystalline silicon film 110. Next, only the polycrystalline silicon film 110 to constitute the storage capacitor CS is selectively doped to form the first electrode C1 of the storage capacitor CS.

Then a gate electrode 113 and the second electrode C2 of the storage capacitor CS are formed of a doped polycrystalline silicon film according to photolithography. At this step, in the pixel region P21, the gate electrode 113 and the gate line G2 are electrically connected, and the second electrode C2 and the adjacent gate line G1 are electrically connected.

Next, a source region 111 and a drain region 112 are formed by implanting ions with the gate electrode 113 used as a mask. And after an interlayer insulating film 115 is formed, a through-hole is made in it.

Then a source terminal 118 and a drain terminal 119 are electrically connected with the source region 111 and the drain region 112, respectively. The source terminal 118 is electrically connected with the source line S1, while the drain terminal 119 is electrically connected with the pixel electrode 12.

As was described above, the TFT 11 and the storage capacitor CS are formed in the pixel region P21, and at the same time, as shown in FIGS. 15(B) and (C), the storage capacitor CS is formed in the pixel regions P11, P12 and P22, too.

When the pattern shown in FIG. 14 is used, however, if the alignment is not obtained along the horizontal direction (in the X direction) in forming each component on the substrate 10 according to photolithography, in the pixel regions P12, P22, P32, . . . in the Y direction along the source line S2, for example, the structure parameter varies at every line.

In other words, in FIG. 16, when the overlap of a formation pattern A1 of a lower polycrystalline silicon film to form the TFT 11 and the first electrode C1 of the storage capacitor CS, and a formation pattern A2 of an upper polycrystalline silicon film to form the gate lines G1, G2, G3, . . . , the gate electrode 113 and the second electrode C2 of the storage capacitor CS is patterned with oblique lines as facing portions C0 of the storage capacitors CS, if the alignment is not obtained along the horizontal direction between the formation pattern A1 of the lower polycrystalline silicon film and the formation pattern A2 of the upper polycrystalline silicon film, the area of the facing portions C0 patterned with oblique lines varies between the storage capacitors CS (ODD) (these storage capacitors are connected with the gate lines G0, G2, . . .) of the pixel regions P11, P12, . . . P31, P32, . . . at odd-numbered lines selected by the gate lines G1, G3, . . . , and the storage capacitors CS (EVEN) (these storage capacitors are connected with the gate lines G1, G3, . . . ) of the pixel regions P21, P22, . . . selected by the gate lines G2, (G4), . . .

Since FIG. 16 shows an ideal example in which the alignment is obtained right and left, the capacitance value of the storage capacitor CS (ODD) is equal to that of the storage capacitor CS (EVEN).

If the alignment is not achieved in the horizontal direction, however, the capacitance value of the storage capacitor CS (ODD) is different from that of the storage capacitor CS (EVEN). For example, if the formation pattern A1 of the lower polycrystalline silicon thin film is displaced from the formation pattern A2 of the upper polycrystalline silicon thin film in the direction shown by an arrow R, the capacitance value of the storage capacitor CS (ODD) increases whereas that of the storage capacitor CS (EVEN) decreases.

As a result, when the N-type TFT is used, because the optimum LC common voltage of the gate lines G1, G3, . . . at odd-numbered lines is higher than that of the gate lines G2, . . . at even-numbered lines, there occurs a difference between the two optimum LC common voltages, and flickers are caused in each gate line.

In order to solve the above-mentioned problems, an object of the present invention is to provide an active matrix substrate which does not produce flickers even when the pixel electrodes in each of the pixel regions connect with the same source line alternately from right and left at every line, by improving the formation pattern of each of the electrodes constituting the storage capacitors.

Another object of the present invention is to provide a high-quality color liquid crystal display using an active matrix substrate formed as described above.

DISCLOSURE OF THE INVENTION

In order to solve the above-mentioned problems, according to a first aspect of the present invention, an active matrix substrate is provided with a plurality of gate lines running in the X direction; a plurality of source lines running in the Y direction crossing at right angles with the X direction; a plurality of pixel electrodes placed corresponding to the intersections of the gate lines and the source lines; a plurality of thin film transistors placed corresponding to the pixel electrodes and having a gate electrode electrically connected with the gate lines, a source region electrically connected with the source lines and a drain region electrically connected with the pixel electrodes; and a plurality of storage capacitors placed corresponding to the pixel electrodes and having a first electrode electrically connected with the pixel electrodes and a second electrode electrically connected with the adjacent gate line.

Of a plurality of pixel electrodes electrically connected with the same source line through the thin film transistors, the pixel electrodes adjacent to each other in the Y direction are placed in such a way as to be on opposite sides from each other across the same source line, while the storage capacitors electrically connected with the adjacent gate lines have the same relative formation position of the first electrode to the second electrode.

According to a second aspect of the present invention, an active matrix substrate has a plurality of gate lines running in the X direction; a plurality of storage capacitance lines running in the X direction; a plurality of source lines running in the Y direction crossing at right angles with the X direction; a plurality of pixel electrodes placed corresponding to the intersections of the gate lines and the source lines; a plurality of thin film transistors placed corresponding to the pixel electrodes and having a gate electrode electrically connected with the gate lines, a source region electrically connected with the source lines, and a drain region electrically connected with the pixel electrodes and; and a storage capacitor placed corresponding to the pixel electrodes and having a first electrode electrically connected with the pixel electrodes and a second electrode electrically connected with the storage lines.

Of a plurality of pixel electrodes electrically connected with the same source line through the thin film transistors, the pixel electrodes adjacent to each other in the Y direction are placed in such a way as to be on opposite sides from each other across the same source line, and the storage capacitors electrically connected with the adjacent storage lines have the same relative formation position of the first electrode to the second electrode.

In the active matrix substrate constituted as was described above, since the relative position of the first electrode to the second electrode is the same between the storage capacitors adjacent to each other in the Y direction, even if the alignment is not obtained when each of the components is formed according to photolithography, there does not occur a difference in the facing area between the first and second electrodes of the storage capacitors, and it is possible to make the capacitance value of the storage capacitors uniform.

Accordingly, by using the active matrix substrate constituted as described above in a liquid crystal display, it becomes possible to prevent the occurrence of flickers in each of the gate lines caused by the difference of a storage capacitance value between adjacent storage capacitors.

According to the present invention, in order to constitute a color liquid crystal display according to a delta arrangement making use of the above-mentioned active matrix substrate, a first color filter array in which three color filters of red, green and blue formed corresponding to the pixel electrodes are arranged periodically in the X direction with the three colors forming a single unit, and a second color filter array which is adjacent to the first color filter array in the Y direction and in which the three colors are arranged periodically in the X direction as one unit are formed. Then the first and second color filter arrays are displaced from each other in the X direction by ½ of the one unit period, and at the same time, only the pixel electrodes corresponding to the color filter of the same color are connected with the same source line.

According to the present invention, in order to constitute a color liquid crystal display according to a mosaic arrangement making use of the above-mentioned active matrix substrate, unlike in the case of the delta arrangement, the first and second color filter arrays are displaced from each other in the X direction by ⅓ of the one unit period, and at the same time, only the pixel electrodes corresponding to the color filter of the same color are connected with the same source line.

BRIEF DESCRIPTION OF THE DRAWINGS

FIG. 13 shows one example of a color arrangement pattern according to a mosaic arrangement;

BEST MODE FOR CARRYING OUT THE INVENTION

EXAMPLE 1

Figure 1:
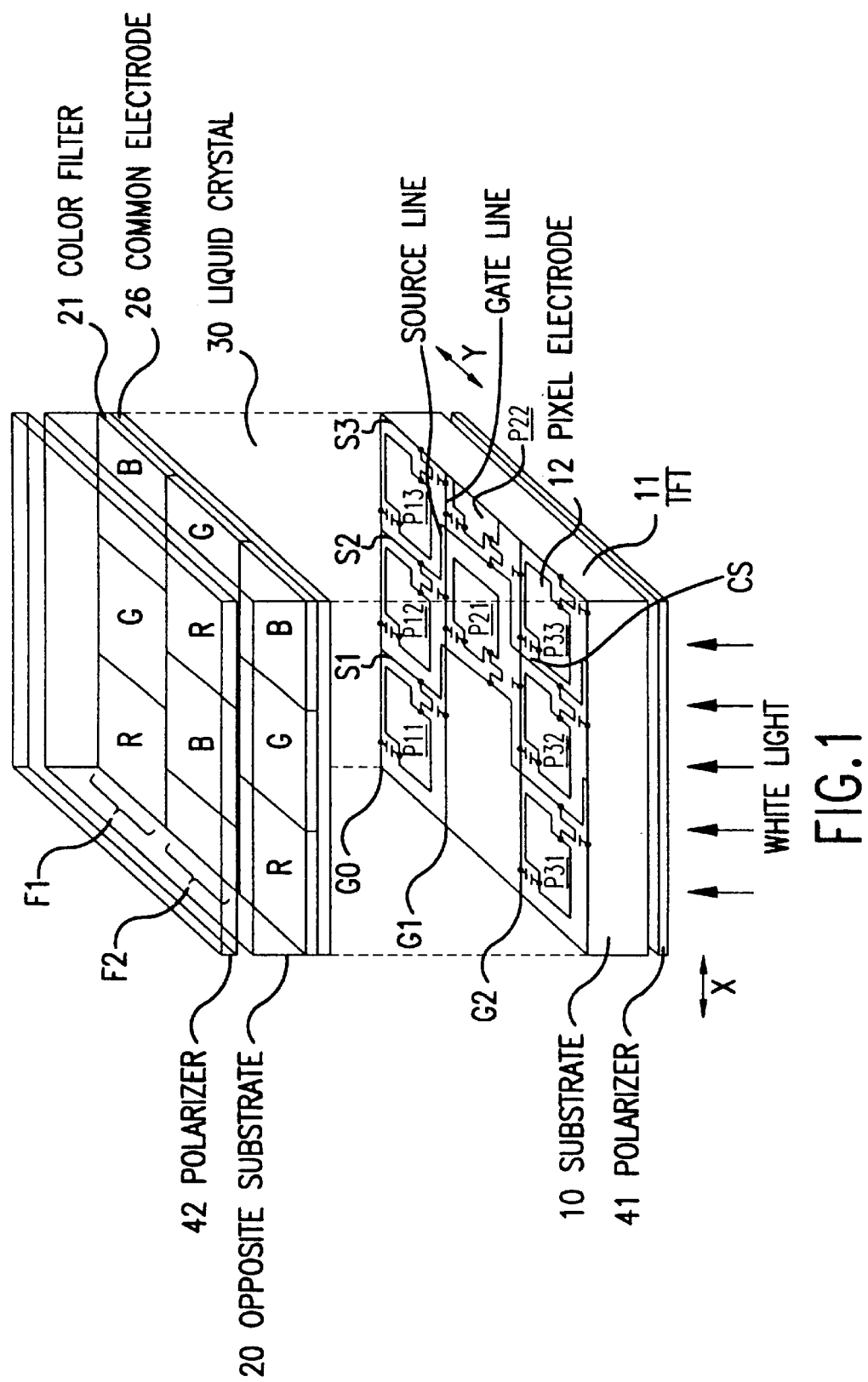
FIG. 1 shows the basic structure of a color liquid crystal display using an active matrix substrate.
Figure 2:
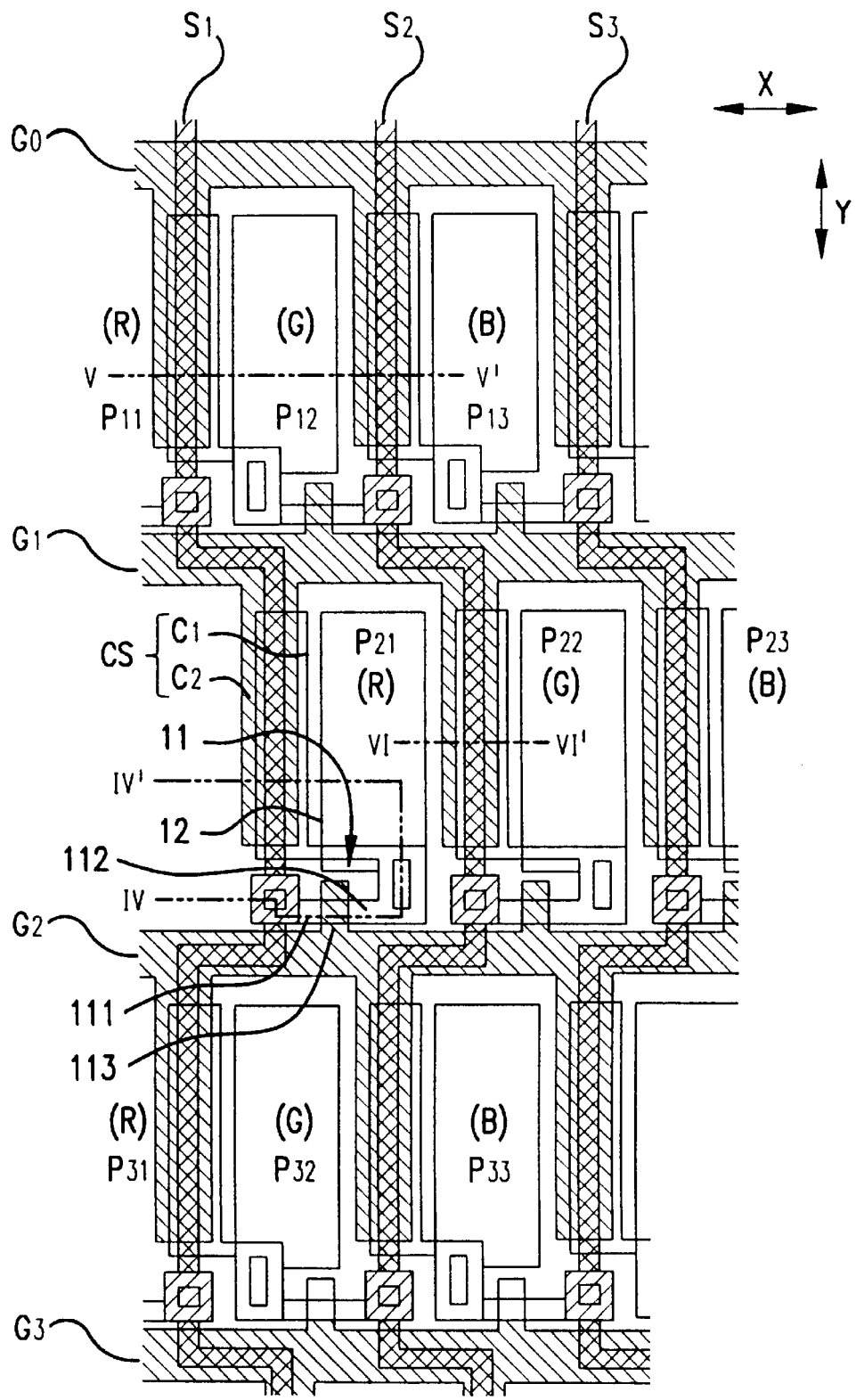
FIG. 2 is a plan view showing the formation pattern of each of the components of the active matrix substrate used in the liquid crystal display in the first example.

FIG. 1 illustrates the basic structure of a color liquid crystal display using an active matrix substrate. FIG. 2 is a plan view showing the formation pattern of each of the components of the active matrix substrate used in the liquid crystal display in this example. Because the active matrix substrate in this example is similar to conventional active matrix substrates except the formation pattern of each of the components in pixel regions, a detailed explanation of the components having a common function will be omitted by giving each of the components the same symbol.

In FIG. 1, the color liquid crystal display in this example has pixel regions P11, P12, P13, . . . corresponding to the intersections of gate lines G0, G1, G2, . . . running in the X direction and source lines S1, S2, S3, . . . running in the Y direction on the surface of a transparent substrate 10 constituting the active matrix substrate. In each of the pixel regions P11, P12, P13, . . . , a transparent pixel electrode 12 is connected with the source lines S1, S2, S3, . . . through a TFT 11. And in the period in which the TFT 11 is on by the signals from the gate lines G1, G2, G3, . . . (selection period), picture signals provided by the source lines S1, S2, S3, . . . are written in a liquid-crystal-capacitance portion CLC. Whereas in the period in which the TFT 11 is off (non-selection period), the picture signals written in the liquid-crystal-capacitance portion CLC in the selection period are retained.

In order to achieve a high-quality display, the storage characteristics in the non-selection period need to be good. For that purpose, of the gate lines G0, G1, G2, . . . , between the adjacent gate line and a pixel electrode 12 is a storage capacitor CS. Of the gate lines G0, G1, G2, . . . , the gate line G0 is substantially an exclusive capacitance line, because the gate electrode of the TFT 11 is not connected with the gate line G0.

Outside the substrate 10 and the opposite substrate 20 are polarizers 41 and 42.

Figure 12:
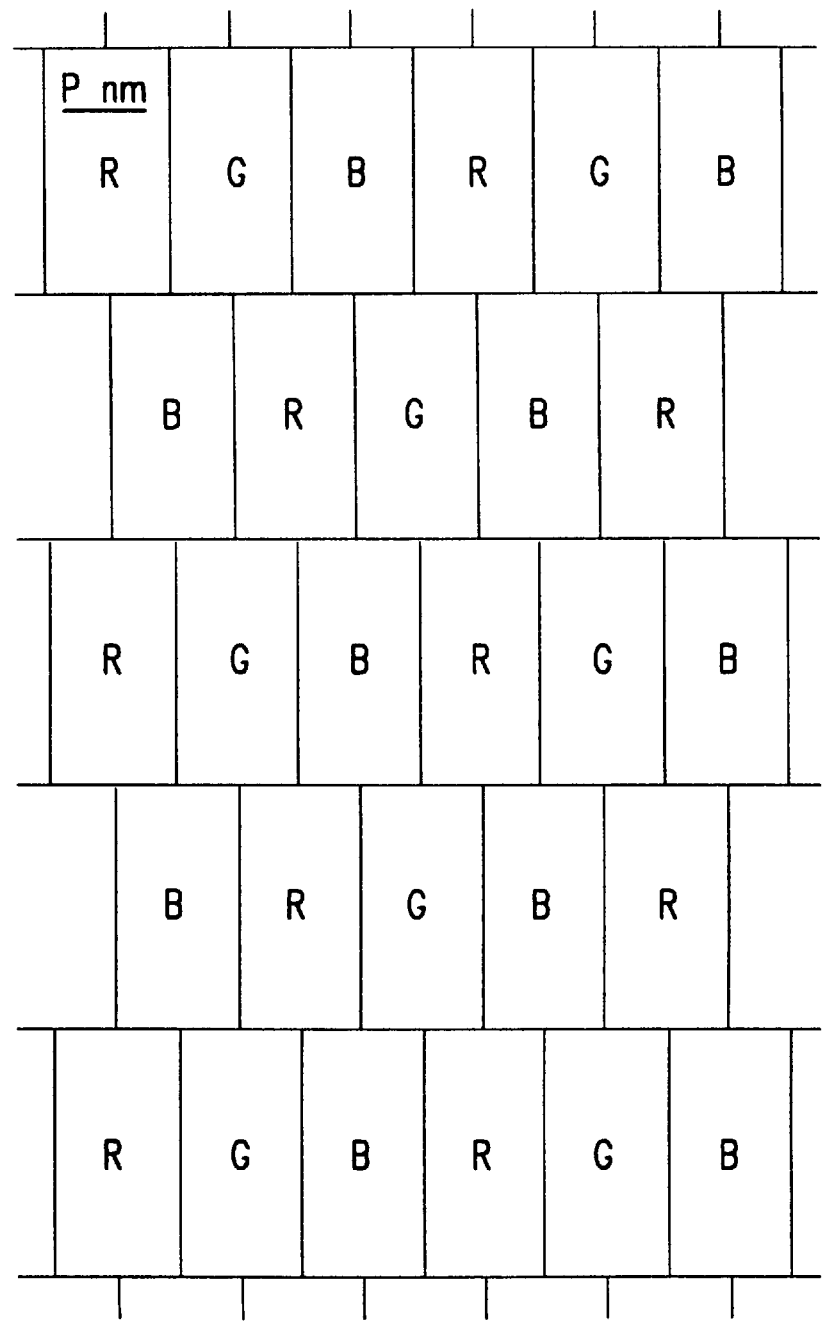
FIG. 12 shows a color arrangement pattern according to a delta arrangement.
Figure 14:
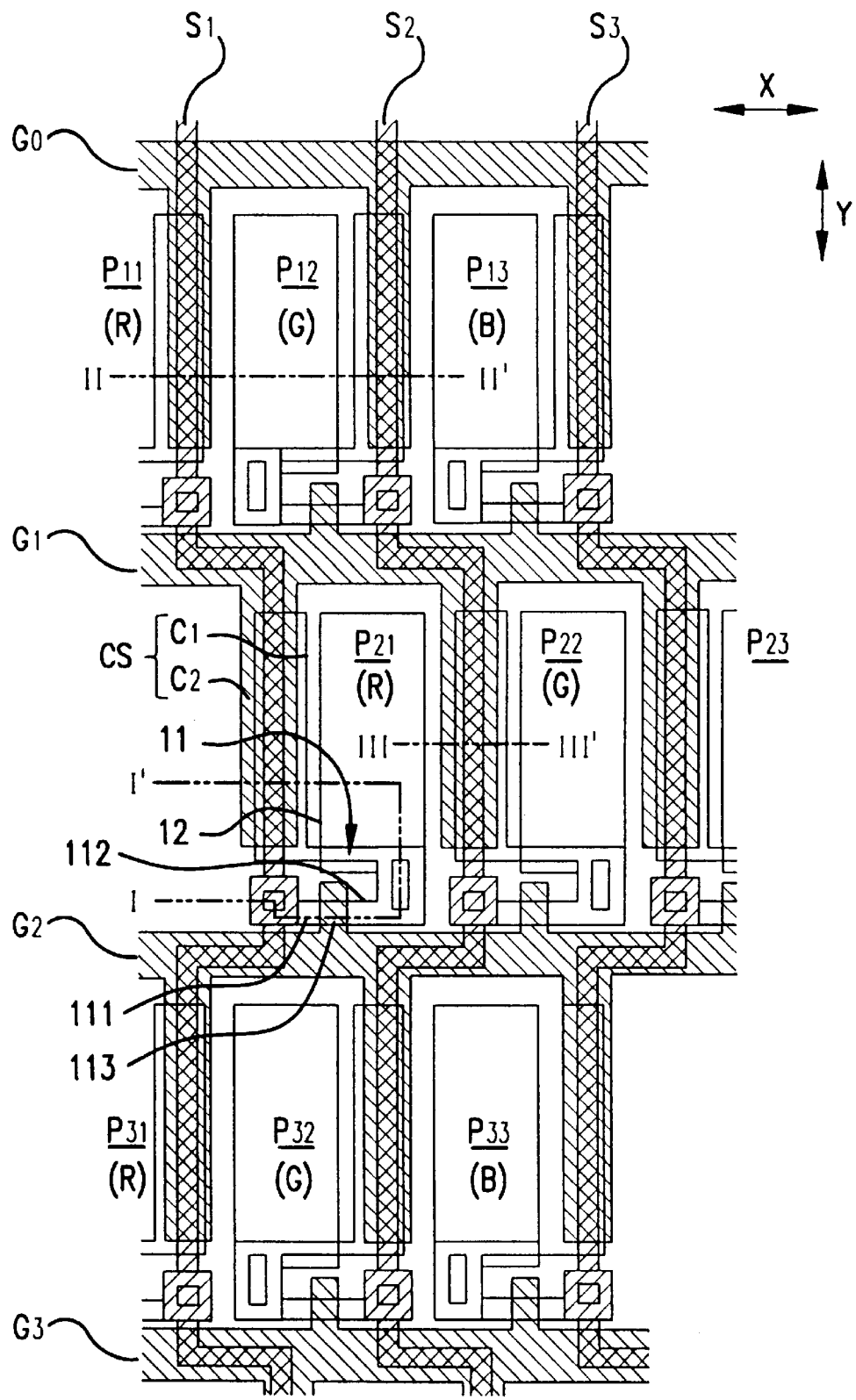
FIG. 14 is a plan view showing the formation pattern of each of the components of the active matrix substrate used in a conventional liquid crystal display.
Figure 15A:
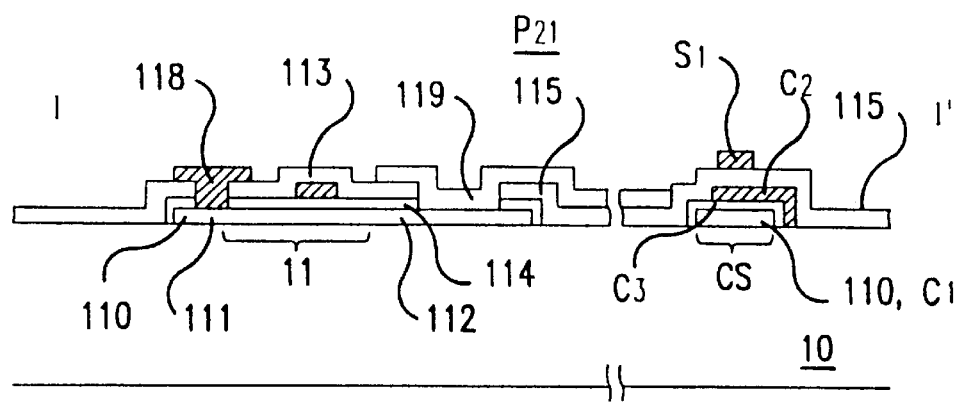
FIG. 15(A) is a sectional view of FIG. 14 cut along I–I' line.
Figure 15B:
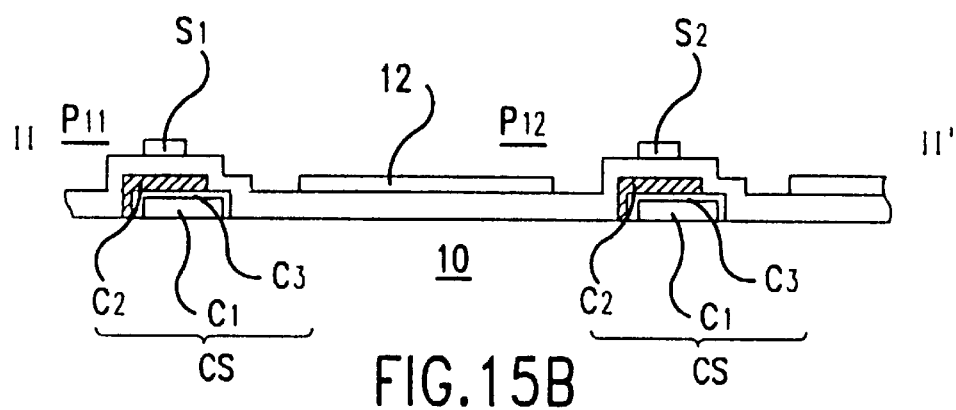
FIG. 15(B) is a sectional view of FIG. 14 cut along II–II' line.
Figure 15C:
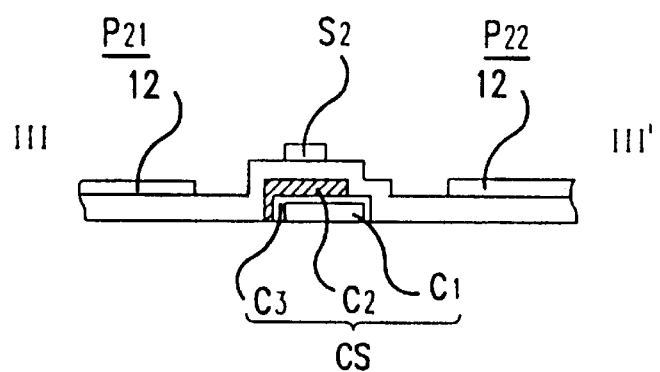
FIG. 15(C) is a sectional view of FIG. 14 cut along III–III' line.
Figure 16:
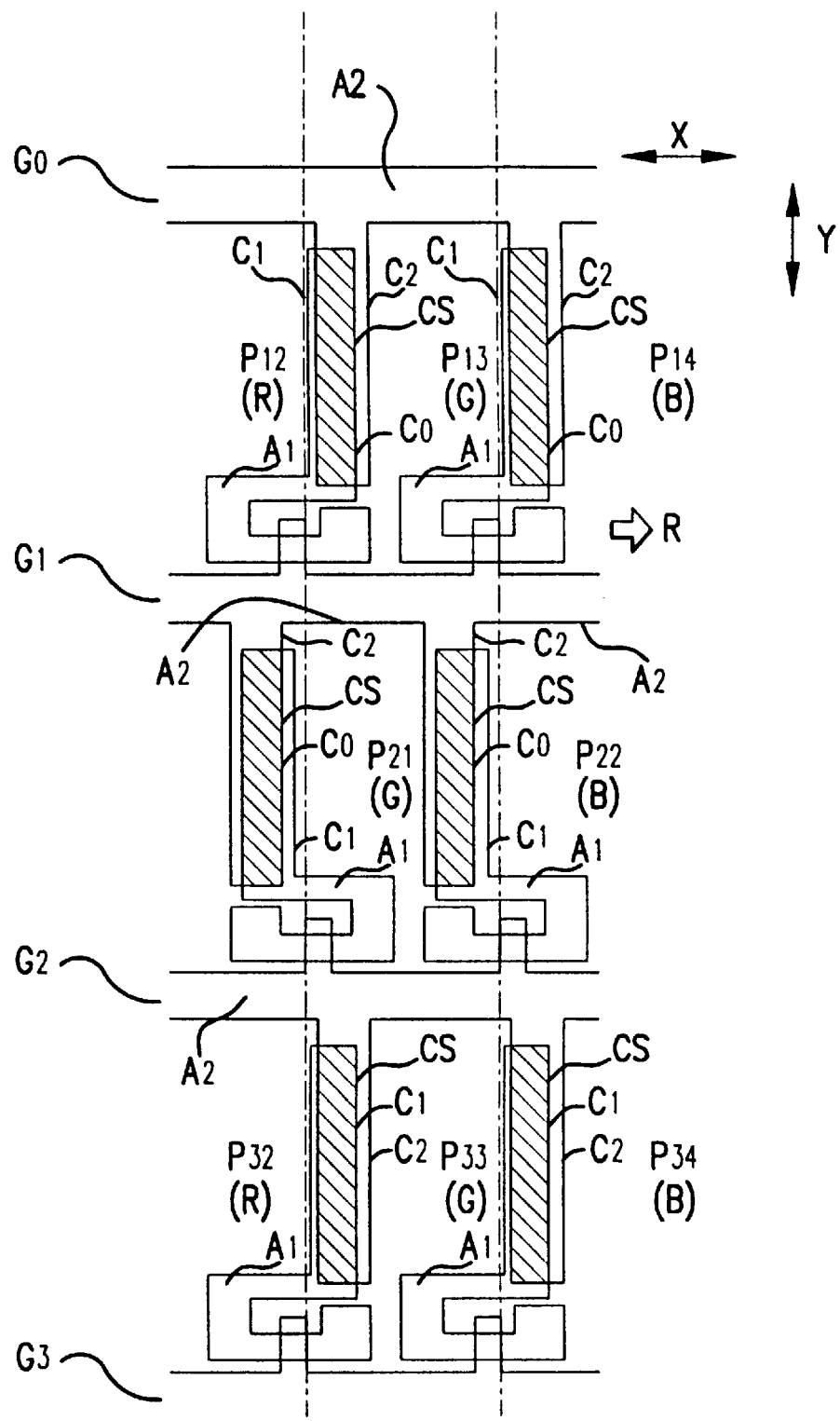
FIG. 16 is a plan view schematically showing the formation pattern of each of the silicon films constituting the two electrodes of the storage capacitor on the substrate surface in the active matrix substrate shown in FIG. 14.

The opposite substrate 20 has a color filter 21. The color filter 21 generally consists of a red filter R, a green filter G and a blue filter B. The pixel electrode 12 of each of the pixel regions P11, P12, P13 . . . is placed corresponding to the color filter 21 consisting of these three colors. The color filter 21 in this example has a delta arrangement (FIG. 12). That is, the opposite substrate 20 has a first color filter array F1 (color filter array at an odd-numbered line) in which a set of color filters of three colors of red (R), green (G) and blue (B) forming one unit is arranged periodically in the X direction, and a second color filter array F2 (color filter array at an even-numbered line) which is adjacent to the first color filter array in the Y direction, and in which a set of said three colors as one unit is arranged periodically in the X direction, and the first color filter array F1 and the second color filter array F2 are displaced from each other in the X direction by ½ of said one unit period. According to the delta arrangement constituted as described above, since each of the color elements is dispersed uniformly in the picture, the delta arrangement is particularly suitable for the picture display which requires a delicate picture quality.

Figure 3:
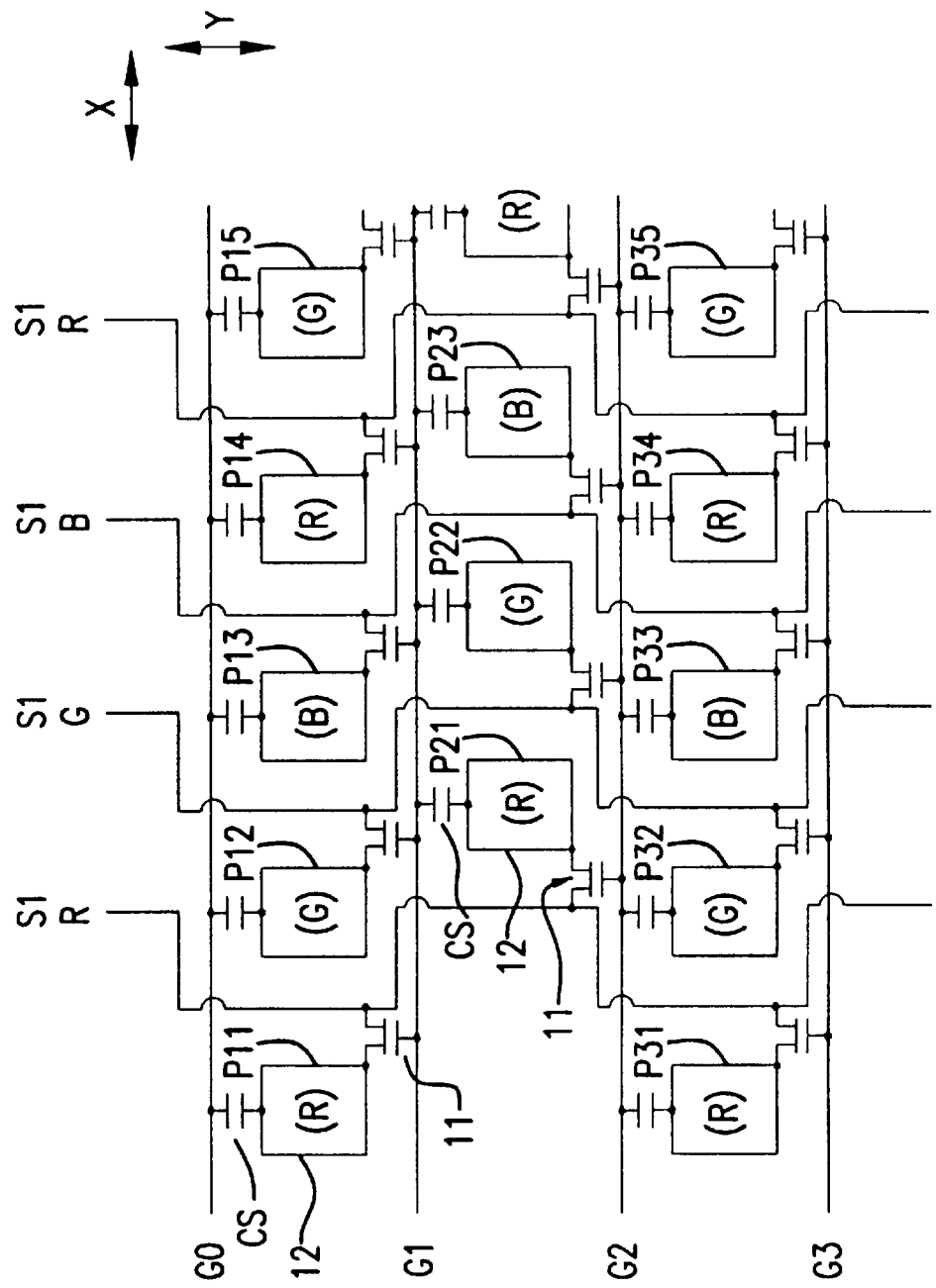
FIG. 3 is a schematic diagram of the formation pattern illustrated in FIG. 2.

Corresponding to the color filter arrangement formed as described above, on the active matrix substrate, as shown in FIGS. 2 and 3, a first pixel array (pixel array at an odd-numbered line) is formed in which a set of three pixel regions P11, P12 and P13 corresponding to the red filter R, the green filter G and the blue filter B as one unit is periodically placed in the X direction. In a second pixel array (pixel array at an even-numbered line) adjacent to the first pixel array in the Y direction, pixel regions P21, P22 and P23 corresponding to the same single unit are displaced from the first pixel array in the X direction by a ½ period. In a pixel array adjacent to the second pixel array in the Y direction (pixel array at an odd-numbered line), pixel regions P31, P32 and P33 corresponding to the same single unit are displaced from the pixel regions P21, P22 and P23 in the opposite direction by a ½ period. Accordingly, the pixel array containing the pixel regions P31, P32 and P33 is in a state in which the pixel array containing the pixel regions P11, P12 and P13 is translated in the Y direction. As a result, the centers of the pixel regions P11, P12, P13, . . . are displaced from each other right and left by 1.5 pixel pitches at each line in the Y direction.

Each of the source lines S1, S2, S3, . . . is extended in a crank-like shape in the Y direction. Only the pixel corresponding to the same color is connected with the same source line. Accordingly, it will be enough for the same source line to supply only signals to display one of red, green or blue. Note that in this example source lines having a crank-like shape extending in the Y direction were used, but that source lines snaking in a curved manner in the Y direction can also be used.

Because each of the pixel regions has the same basic structure, the pixel region P21 will be explained as an example. As FIG. 2 shows, a gate electrode 113 of the TFT 11 is connected with the gate line G2, a source region 111 is connected with the source line S1, and a drain region 112 is connected with a pixel electrode 12. The pixel region P21 has a first electrode C1 electrically connected with the drain region 112 and the pixel electrode 12, and the first electrode C1 is made of a doped silicon film. The pixel region P21 also has a second electrode C2 running in the Y direction from the adjacent gate line G1.

The first electrode C1 and the second electrode C2 are opposed to each other across a dielectric film, and a storage capacitor CS is formed between the adjacent gate line G2 and the pixel electrode 12.

On the active matrix substrate formed as described above, of the pixel regions P11, P12, P13, . . . , only the pixel electrode 12 of the pixel regions corresponding to the same color of each of the color filters 21 according to the delta arrangement is connected with the crank-shaped source lines S1, S2, S3, . . . Therefore, the pixel electrode 12 of the pixel regions P12, P22, P32, . . . corresponding to green (G) is connected with the same source line S2 displaced alternately from right and left in the Y direction. The same is true of other source lines S1, S3, . . .

Among the pixel regions P1, P12, P13, . . . along the gate line G1 in the X direction, the relative position of the TFT 11, the pixel electrode 12 and the storage capacitor CS (the first electrode C1 and the second electrode C2) is the same. And among the pixel regions P21, P22, P23, . . . along the gate line G2 in the X direction, the relative position of the TFT 11, the pixel electrode 12 and the storage capacitor CS (the first electrode C1 and the second electrode C2) is also the same.

Among the pixel regions P12, P22, P32, . . . along the source line S2 in the Y direction, on the other hand, the relative position of the TFT 11 and the pixel electrode 12 is reversed right and left at each line. That is, between the pixel regions P11, P12, P13, . . . at odd-numbered lines connected with the gate line G1 and the pixel regions P21, P22, P23, . . . at even-numbered lines connected with the gate line G2, the formation pattern of the TFT 11 and the pixel electrode 12 is symmetrical horizontally.

The storage capacitors CS, however, are formed in the same relative position in any of the pixel regions. In other words, the relative position of the storage capacitors CS in the pixel region is the same between the storage capacitors CS adjacent to each other in the Y direction.

And the relative position of the first electrode C1 of the storage capacitor CS and the second electrode C2 projecting from the adjacent gate lines G0, G1, G2, . . . is the same in either the X direction or the Y direction among the pixel regions P12, P22, P32, . . .

In the pixel region P12 connected with the gate line G1, for example, a storage capacitor CS is formed in the region through which the adjacent source line S1 runs. Similarly, in the pixel region P32 connected with the gate line G3, a storage capacitor CS is formed in the region through which the adjacent source line S1 runs. Accordingly, in any of the pixel regions P11, P12, . . . P31, P32, . . . connected with the gate lines G1 and G3, the first electrode C1 of the storage capacitor CS runs from the connection position with the drain region 112 of the TFT 11 to the left region of the pixel electrode 12, and overlaps the second electrode C2 projecting from the adjacent gate lines G0 and G2 in the left region.

In the pixel region P22 connected with the gate line G2, on the other hand, a storage capacitor CS is formed in the region through which the source line S2 runs with which the pixel region P22 itself is connected. Accordingly, in any of the pixel regions P21, P22, . . . connected with the gate line G2, the first electrode C1 of the storage capacitor CS turns back from the connection position with the drain region 112 of the TFT 11 toward the source region 111, and from near the source region 111 runs to the left region of the pixel electrode 12, as in the pixel regions P11, P12, . . . , P31, P32, . . . at odd-numbered lines. And the first electrode C1 overlaps the second electrode C2 projecting from the adjacent gate line G1 (FIG. 3).

Figure 4A:
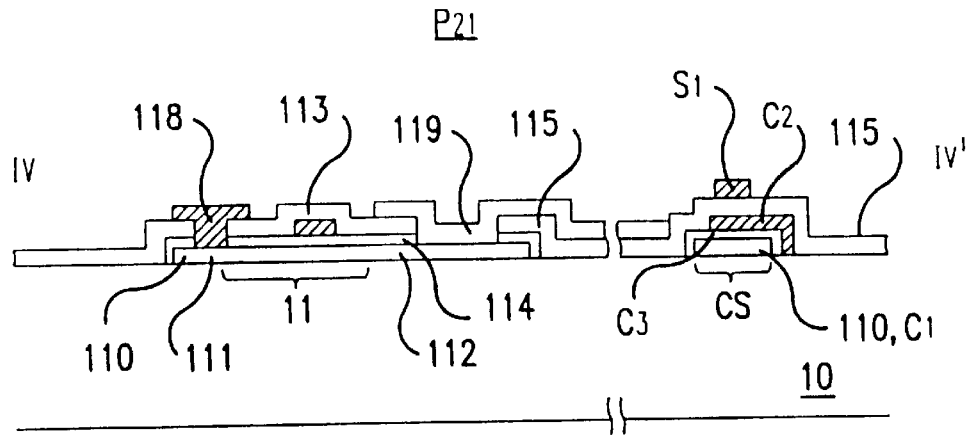
FIG. 4(A) is a sectional view of FIG. 2 cut along IV–IV' line.

The manufacturing method of the active matrix substrate constituted as described above will be explained with reference to FIG. 4. FIGS. 4(A), (B) and (C) are sectional views of FIG. 2 cut along IV–IV' line, V–V' line, and VI–VI' line, respectively.

In FIG. 4(A), first a polycrystalline silicon thin film 110 to constitute an active region of the TFT 11 and the first electrode C1 of the storage capacitor CS is formed on the substrate 10 made from silica glass according to photolithography.

Then by thermal oxidation of the polycrystalline silicon film 110, a gate oxide 114 and an insulation film C3 of the storage capacitor CS are formed. Next, by selectively doping only the polycrystalline silicon film 110 to form the storage capacitor CS, the first electrode C1 of the storage capacitor CS is formed.

And a gate electrode 113 and the second electrode C2 of the storage capacitor CS are formed of a doped polycrystalline silicon thin film according to photolithography. At this step, in the pixel region P21, the gate electrode 113 is electrically connected with the gate line G2, and the second electrode C2 is electrically connected with the adjacent gate line G1.

Then the source region 111 and the drain region 112 are formed by implanting ions with the gate electrode 113 used as a mask. After a interlayer insulating film 115 is formed, a through-hole is made in the film.

Next, a source terminal 118 and a drain terminal 119 are electrically connected with the source region 111 and the drain region 112, respectively. Note that the source terminal 118 is electrically connected with the source line S1, and the drain terminal 119 is electrically connected with the pixel electrode 12.

Figure 4B:
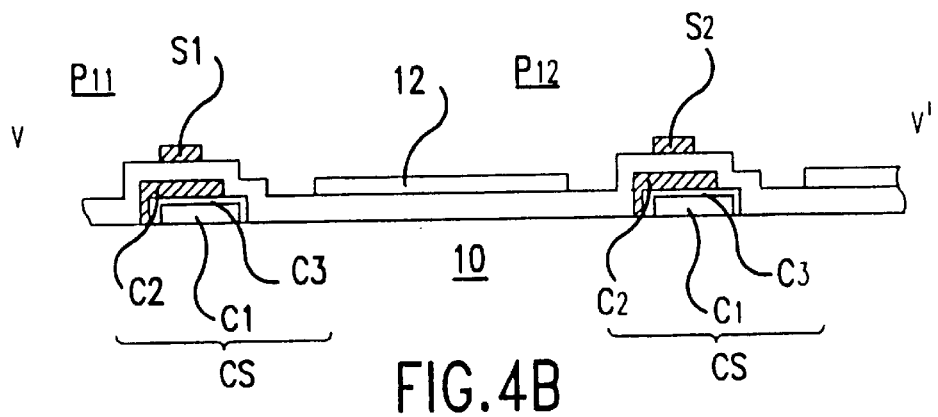
FIG. 4(B) is a sectional view of FIG. 2 cut along V–V' line.
Figure 4C:
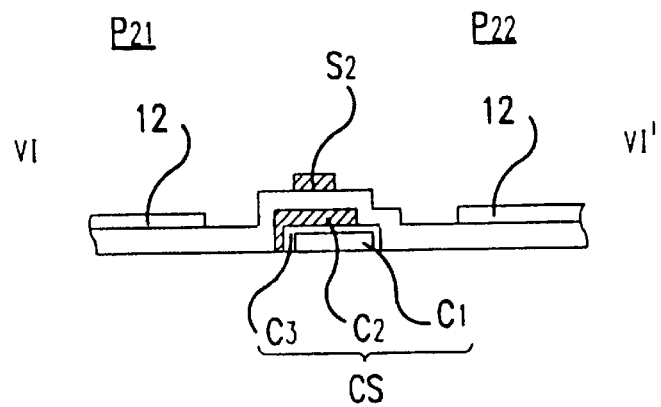
FIG. 4(C) is a sectional view of FIG. 2 cut along VI–VI' line.

As was described above, the TFT 11 and the storage capacitor CS are formed in the pixel region P21, and as shown in FIGS. 4 (B) and (C), the storage capacitors CS are formed in the pixel regions P11, P12 and P22, too.

Figure 5:
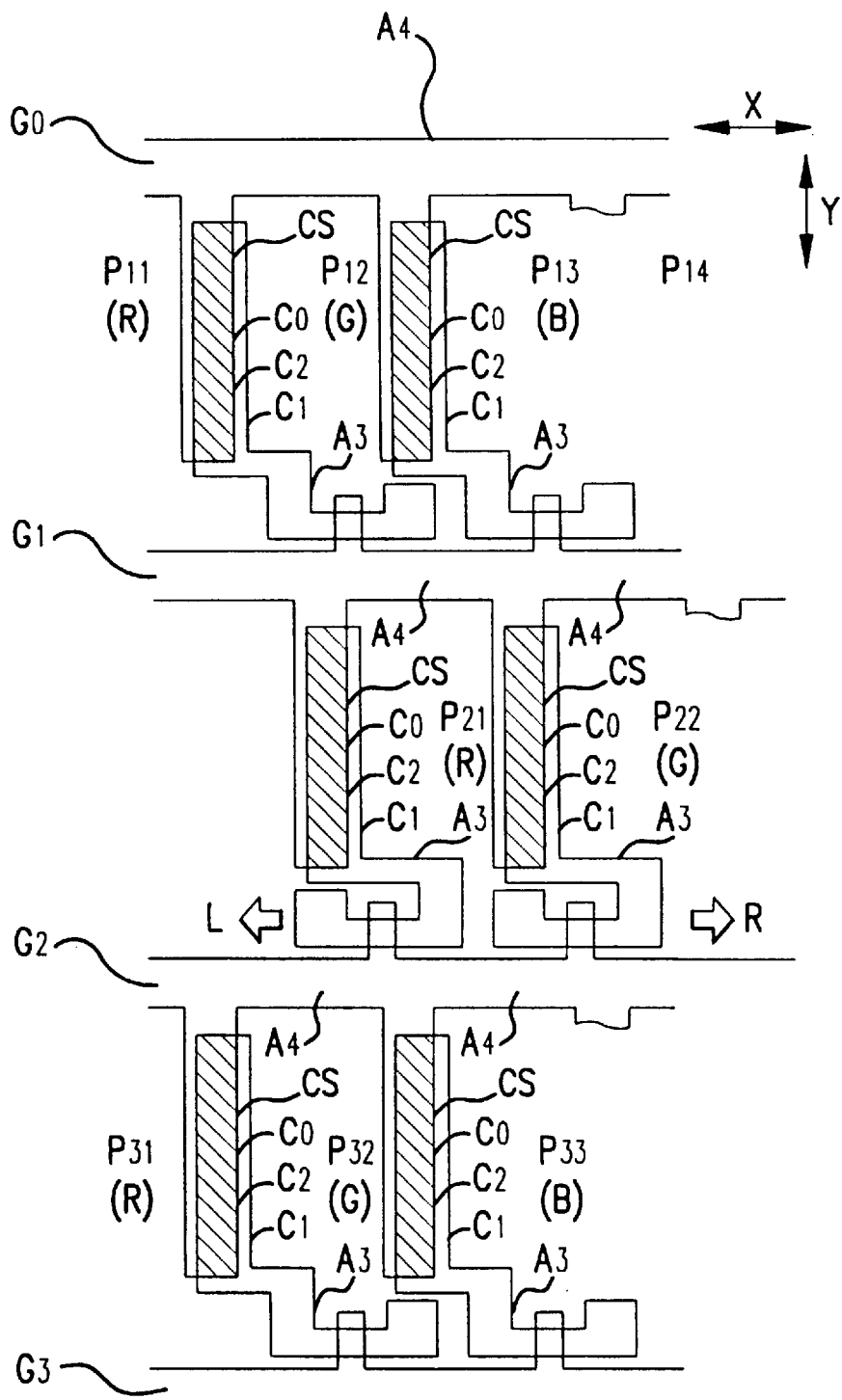
FIG. 5 is a plan view schematically showing the formation pattern of each of the silicon films constituting the two electrodes of the storage capacitor on the substrate surface in the active matrix substrate shown in FIG. 2.

By the manufacturing method described above, even if the alignment of the patterning mask is not obtained right and left (in the X direction) when each of the components is formed on the substrate 10 according to photolithography, the structural parameter does not vary at each line in each of the pixel regions P11, P12, P13, . . . in this example. That is, in FIG. 5, when the overlap of a formation pattern A3 of a lower polycrystalline silicon film to form the TFT 11 and the first electrode C1 of the storage capacitor CS, and a formation pattern A4 of an upper polycrystalline silicon film to form the gate lines G1, G2, G3, . . . , the gate electrode 113 and the second electrode C2 of the storage capacitor CS is patterned with oblique lines as facing portions C0 of the storage capacitors CS, even if the alignment is not achieved in the X direction between the formation pattern A3 of the polycrystalline silicon film and the formation pattern A4 of the polycrystalline silicon film, the area of the facing portions C0 does not vary between the storage capacitors CS (ODD) in the pixel regions P11, P12, . . . , P31, P32, . . . connected with the gate lines G1, G3, . . . (pixel regions at odd-numbered lines) (these storage capacitors are connected with the gate lines G0, G2, G4, . . . ), and the storage capacitors CS (EVEN) in the pixel regions P21, P22, . . . connected with the gate lines G2, . . . (pixel regions at even-numbered lines) (these storage capacitors are connected with the gate lines G1, G3, G5, . . . ).

For example, if the formation pattern A3 of the polycrystalline silicon thin film is slightly displaced from the formation pattern A4 of the polycrystalline silicon thin film in the direction shown by an arrow R, the result is only that the area of the facing portions C0 of the first electrode C1 and the second electrode C2 decreases in each of the storage capacitors CS in both of the pixel regions P11, P12, . . . , P31, P32, . . . at odd-numbered lines, and the pixel regions P21, P22, . . . at even-numbered lines. On the other hand, if the formation pattern A3 of the polycrystalline silicon thin film is a little displaced from the formation pattern A4 of the polycrystalline silicon thin film in the direction shown by an arrow L, the result is only that the area of the facing portions C0 of the first electrode C1 and the second electrode C2 increases in each of the storage capacitors CS in both of the pixel regions P11, P12, P31, P32, . . . at odd-numbered lines, and the pixel regions P21, P22, . . . at even-numbered lines.

If the perfect alignment is not obtained up and down (in the Y direction), the area of the facing portions C0 of the first electrode C1 and the second electrode C2 in each of the storage capacitors CS does not vary.

As is clear from the foregoing explanation, in the active matrix substrate in this example, because the capacitance value of each of the storage capacitors CS is always the same among the pixel regions P11, P12, . . . P21, P22, . . . , P31, P32, . . . even if the alignment is not obtained right and left (in the X direction) or up and down (in the Y direction) between the formation pattern A3 of the polycrystalline silicon film and the formation pattern A4 of the polycrystalline silicon film, the optimum LC common voltage of the gate lines G1, G3, . . . at odd-numbered lines and that of the gate lines G2, . . . at even-numbered lines are always the same. Accordingly, it is possible to prevent flickers from occurring in each gate line by setting the optimum LC common voltage as a whole.

Furthermore, in this example, among the pixel regions P11, P12, P13, . . . along the source lines S1, S2 and S3 in the Y direction, the relative position of the TFT 11 and the pixel electrode 12 is reversed right and left at each line, and only the formation position and the shape of the first electrode C1 to form the storage capacitor CS differ. Therefore, it is possible to prevent flickers from occurring even if the alignment is not obtained in forming the first electrode C1 and the second electrode C2, only by optimizing the relative position of the first electrode C1 and the second electrode C2. The active matrix substrate in this example is particularly advantageous in realizing a liquid crystal display of high sophistication and high density, because the substrate can be used even when the formation region and the size of each of the components are limited.

Note that the pattern of the components other than the first electrode C1 is substantially the same between the pixel regions P11, P12, . . . corresponding to the gate lines G1, G3, . . . at odd-numbered lines, and the pixel regions P21, P22, . . . corresponding to the gate lines G2, . . . at even-numbered lines. Accordingly, even if the alignment is not obtained between the opposite substrate 20 and the active matrix substrate, or on the active matrix substrate, the difference in the aperture rate is reduced between the pixel regions P11, P12, . . . corresponding to the gate lines G1, G3, . . . at odd-numbered lines, and the pixel regions P21, P22, . . . corresponding to the gate lines G2, . . . at even-numbered lines, and it becomes possible to prevent the nonuniformity of horizontal lines.

EXAMPLE 2

Figure 6:
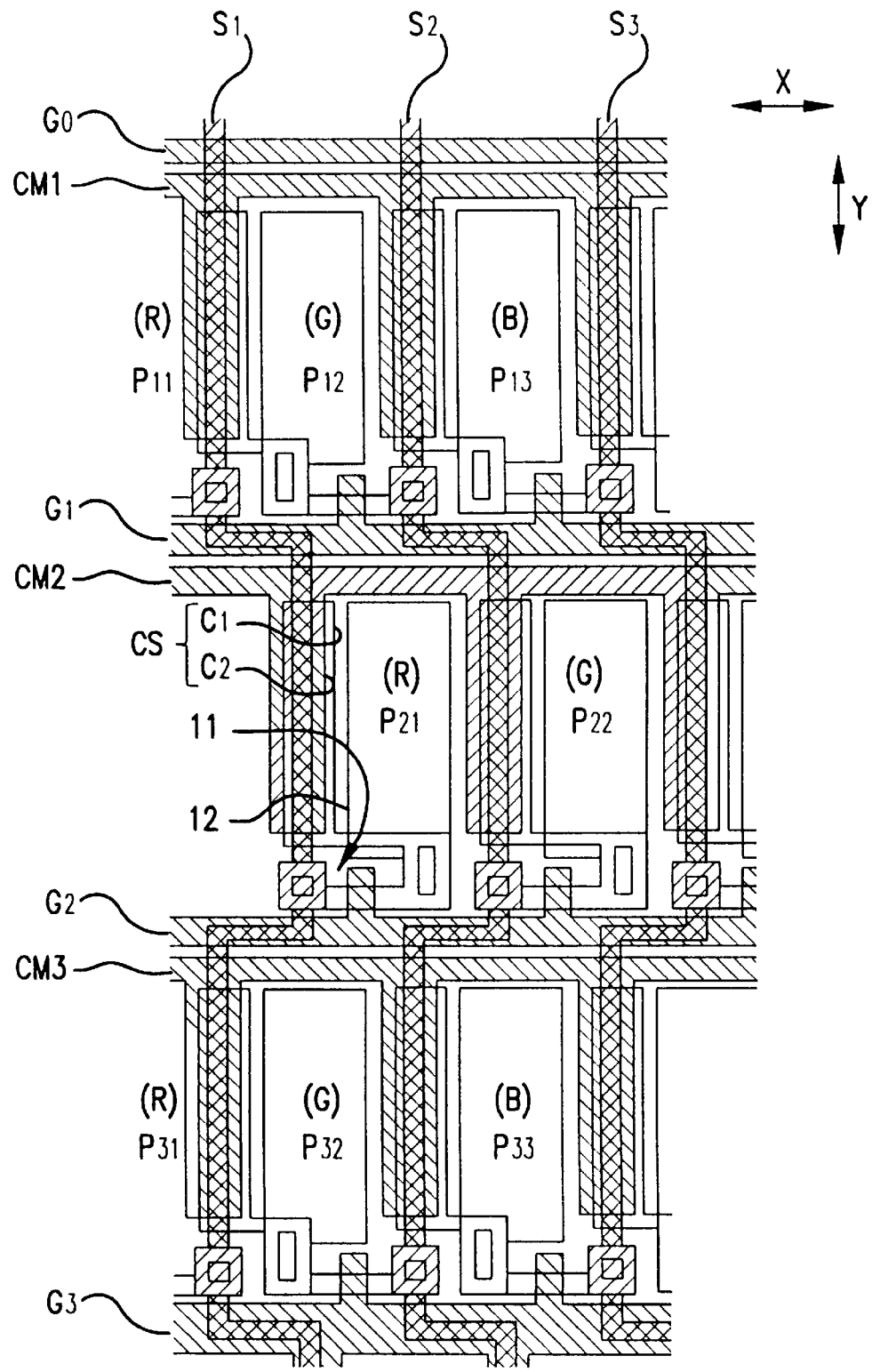
FIG. 6 is a plan view showing the formation pattern of each of the components of the active matrix substrate used in the liquid crystal display in the second example.

FIG. 6 is a plan view showing the formation pattern of each of the components of the active matrix substrate used in the liquid crystal display in this example. Because the active matrix substrate in this example is similar to the active matrix substrate in the first example except the storage capacitors, the components having the corresponding function are given the same symbol.

In the first example, the adjacent gate line was used to form the second electrode C2 of each of the storage capacitors CS, whereas in this example, storage lines CM1, CM2, CM3, . . . of constant potential are formed in the X direction parallel to gate lines G1, G2, G3, . . . , and the storage capacitors CS constitute the second electrode C2 using the storage lines CM1, CM2, CM3, . . .

In the liquid crystal display in this example, as in the first example, a set of three pixel regions P21, P22 and P23 corresponding to red, green and blue as one unit is placed periodically in the X direction. In a pixel array adjacent to each other in the Y direction, pixel regions P11, P12 and P13 and pixel regions P31, P32 and P33 corresponding to a single unit are displaced from each other by a ½ period alternately in the horizontal direction.

Each of the source lines S1, S2, S3, . . . has a crank-like shape. And only the pixel electrode in the pixel region corresponding to the same color is connected with the same source line. Accordingly, it will be enough for the same source line to supply only signals to display one of red, green or blue.

Because each of the pixel regions has the same basic structure, the pixel region P21 will be taken as an example. In the pixel region P21, a first electrode C1 is formed which consists of a doped silicon film electrically connected with a drain region 112 and a pixel electrode 12, and a storage line CM2 forms a second electrode C2 running in the Y direction. The first electrode C1 and the second electrode C2 are opposed to each other across a dielectric film, and in the pixel region P21 a storage capacitor CS is formed between the pixel electrode 12 and the storage line CM2.

In the active matrix substrate constituted as described above, only the pixel electrode 12 of the pixel regions P11, P12, P13, . . . corresponding to the same color of each of the color filters 21 according to the delta arrangement is connected with the crank-shaped source lines, and the pixel electrode 12 of the pixel regions P12, P22 and P32 is connected with the same source line S2 alternately from right and left. The same is true of the other source lines S1, S3, . . .

Accordingly, as in the first example, among the pixel regions P11, P12, P13, . . . in the X direction, the relative position of a TFT 11, the pixel electrode 12 and the storage capacitor CS (the first electrode C1 and the second electrode C2) is the same, while in the Y direction, the relative position of the TFT 11 and the pixel electrode 12 in the pixel regions P12, P22, P32, . . . is reversed right and left at each line.

The storage capacitors CS, however, are formed in the same relative position in any of the pixel regions. In other words, the relative position of the storage capacitors CS in the pixel region is the same between the storage capacitors adjacent to each other in the Y direction.

The relative position of the first electrode C1 of the storage capacitors CS and the second electrode C2 projecting from the storage lines CM1, CM2, . . . is the same between the storage capacitors adjacent to each other in the Y direction. That is, the relative position is the same among each of the pixel regions.

The manufacturing method of the active matrix substrate constituted as described above is almost the same as in the first example, and differs from the method in the first example only in that the storage lines CM1, CM2, CM3, . . . and the second electrode C2 projecting from those lines are formed simultaneously when a gate electrode 113, gate lines G1, G2, G3, . . . are formed.

Figure 7:
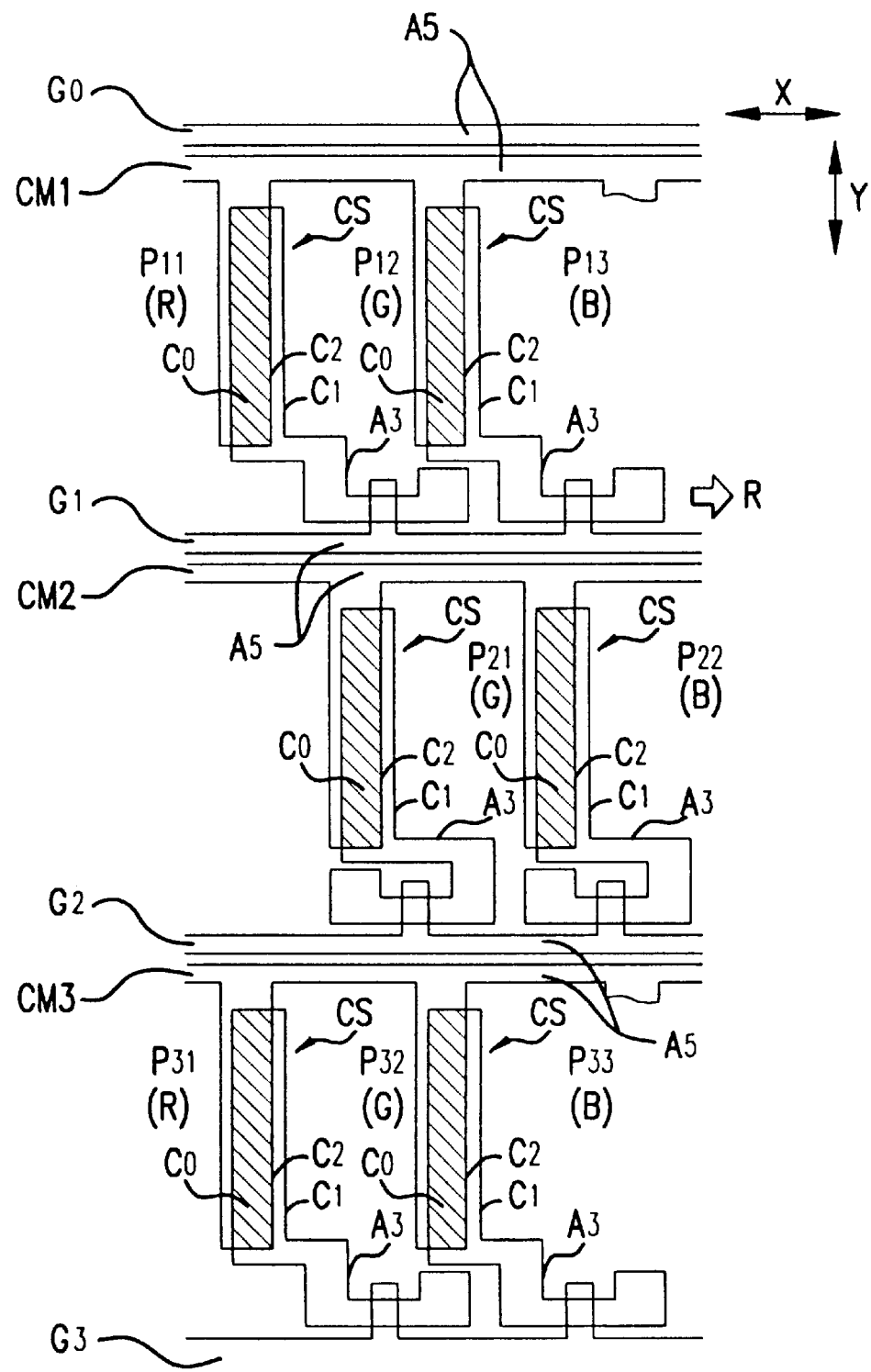
FIG. 7 is a plan view schematically showing the formation pattern of each of the silicon films constituting the two electrodes of the storage capacitor on the substrate surface in the active matrix substrate shown in FIG. 6.

Accordingly, in FIG. 7, when the overlap of a formation pattern A3 of a lower polycrystalline silicon film to form the TFT 11 and the first electrode C1 of the storage capacitor CS, and a formation pattern A5 of an upper polycrystalline silicon film to form the gate lines G1, G2, G3, . . . , the gate electrode 113, the storage lines CM1, CM2, CM3, . . . and the second electrode C2 of the storage capacitor CS is patterned with oblique lines as facing portions C0 of the storage capacitors CS, even if the alignment is not achieved right and left (in the X direction) between the formation pattern A3 of the polycrystalline silicon film and the formation pattern A5 of the polycrystalline silicon film, the area of the facing portions C0 (capacitance value of the storage capacitors CS) patterned with oblique lines is always the same among the pixel regions P11, P12, . . . , P21, P22, . . . , P31, P32, . . . As a result, the second example has effects similar to the effects of the first example, such as the prevention of the occurrence of flickers in each gate line.

EXAMPLE 3

In the first and second examples, a coplanar TFT was used as a switching element, but in this example, a reverse-stagger-type TFT is used instead.

Figure 8:
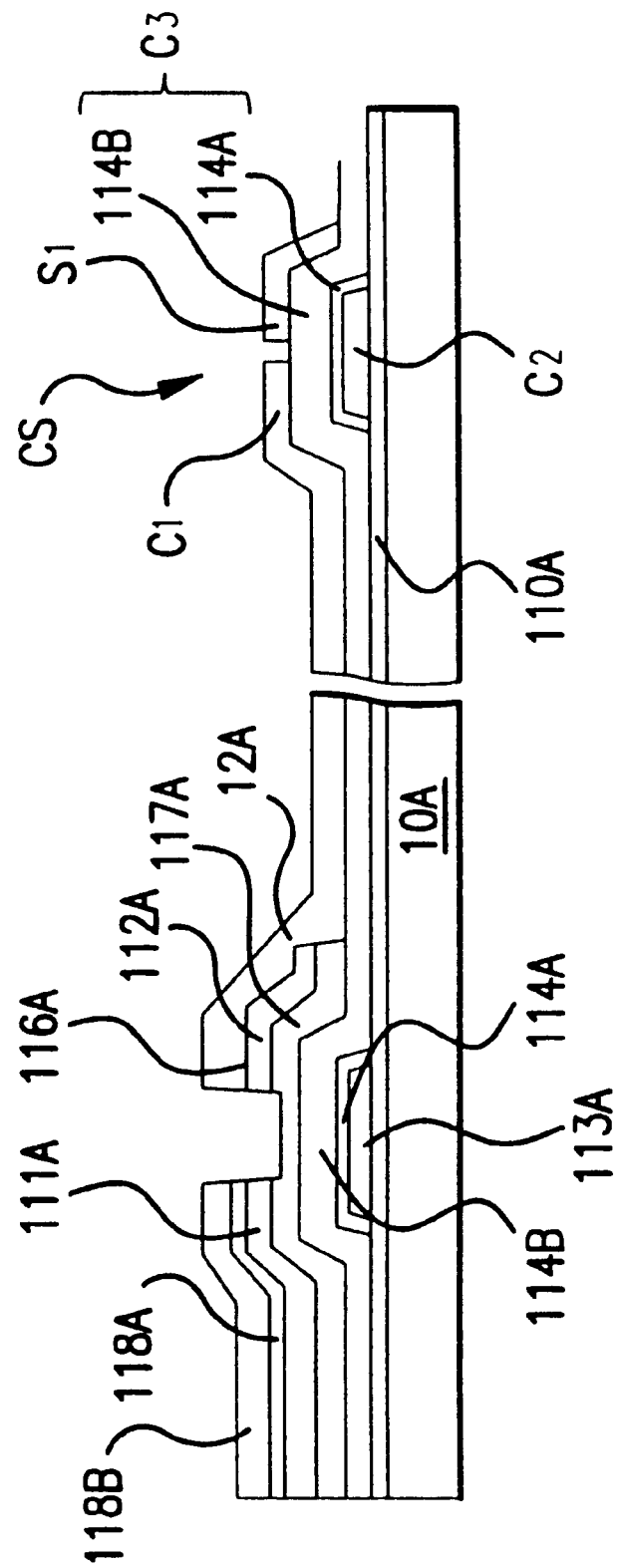
FIG. 8 is a sectional view of a reverse-stagger-type TFT used as a TFT of the active matrix substrate used in the liquid crystal display in the third example.

FIG. 8 is a sectional view of a TFT using an amorphous silicon film in an active layer and a storage capacitor. In FIG. 8, on the surface of a glass substrate 10A, a gate electrode 113A consisting of a tantalum film is formed on a base film 110A, and on the surface of the gate electrode 113A, a tantalum oxide 114A is formed as a gate insulation film. On the surface of the tantalum oxide 114A, a silicon nitride 114B is formed, and the tantalum oxide 114A and the silicon nitride 114B function as the gate insulation film. On the surface of the silicon nitride 114B, an intrinsic amorphous silicon film 117A to form a channel is formed. And on the surface of the intrinsic amorphous silicon film 117A, an N-type amorphous silicon film 116A of high concentration is formed. The N-type amorphous silicon film 116A is etched in the portion facing the gate electrode 113A, and is divided into a source region 111A and a drain region 112A. In the source region 111A, an aluminum electrode layer 118B is formed on a molybdenum layer 118A, and the aluminum electrode layer 118B is connected with the source lines S1, S2, S3, . . . A pixel electrode 12A consisting of an ITO film is connected with the drain region 112A.

Figure 9:
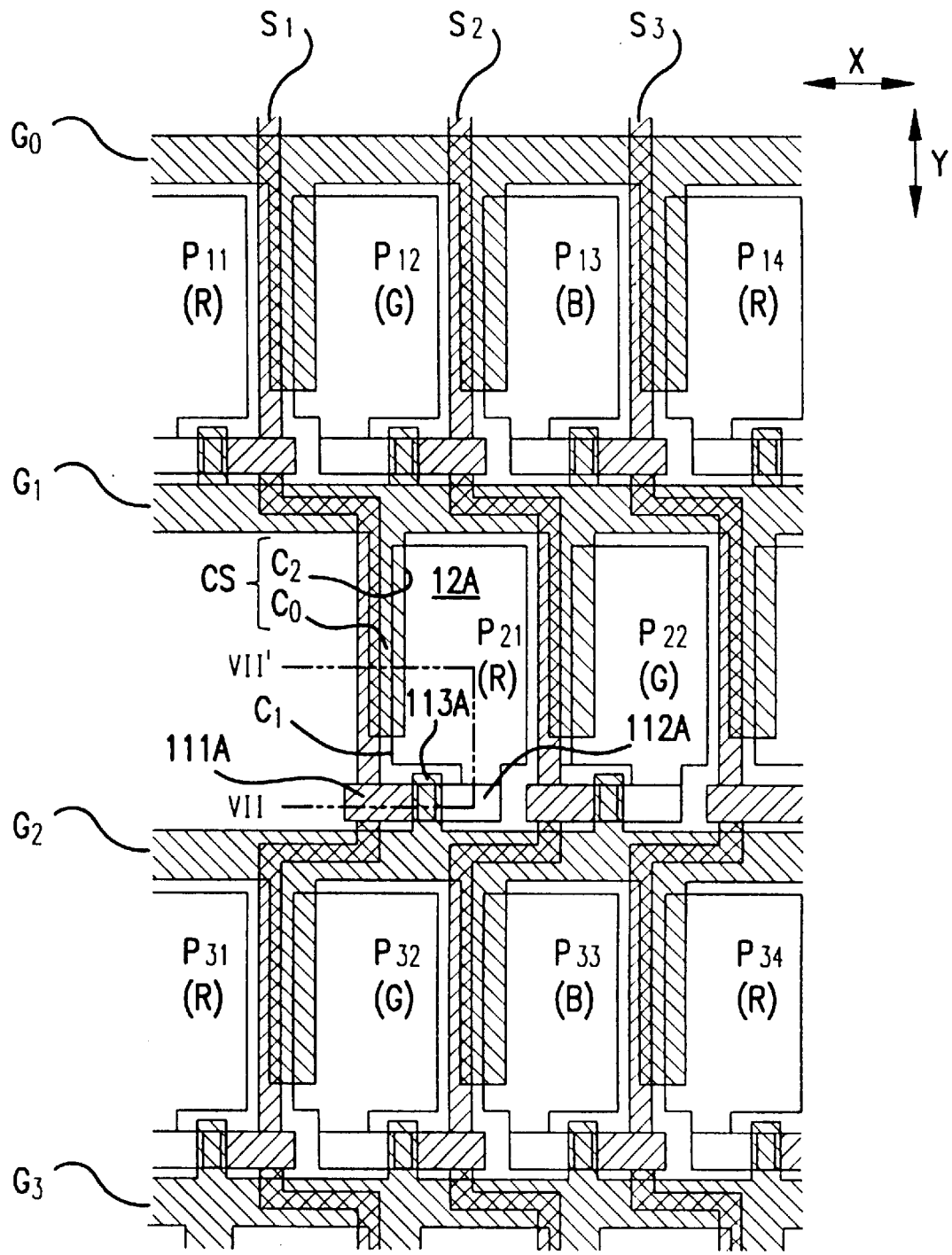
FIG. 9 is a plan view showing the formation pattern of each of the components of the active matrix substrate used in the liquid crystal display in the third example.

The pixel electrode 12A (ITO film), as shown in FIG. 9, stretches to the end of the pixel regions P11, P12, P13, . . . , where the end of the pixel electrode 12A functions as the first electrode C1 of the storage capacitor CS.

In the lower portion of the first electrode C1 is a dielectric film C3 of the storage capacitor CS consisting of the tantalum oxide 114A and the silicon nitride 114B formed simultaneously with the gate insulation film. In the lower portion of the dielectric film C3 is a tantalum film formed simultaneously with the gate electrode 113A, and this tantalum film functions as the second electrode C2 of the storage capacitor CS.

Because the structure is otherwise almost the same as in the first example, it will not be explained in detail. In this example, too, as shown in FIG. 9, the pixel regions P11, P12, P13, . . . are placed corresponding to the color filter 21 according to the delta arrangement. Only the pixel electrode 12A of the pixel regions P11, P12, P13, . . . corresponding to the same color is connected with the same source lines S1, S2, S3, . . . Accordingly, the pixel regions P12, P22, P32, . . . corresponding to green (G) are connected with the same source line S2 alternately from right and left of the source line S2.

Figure 10:
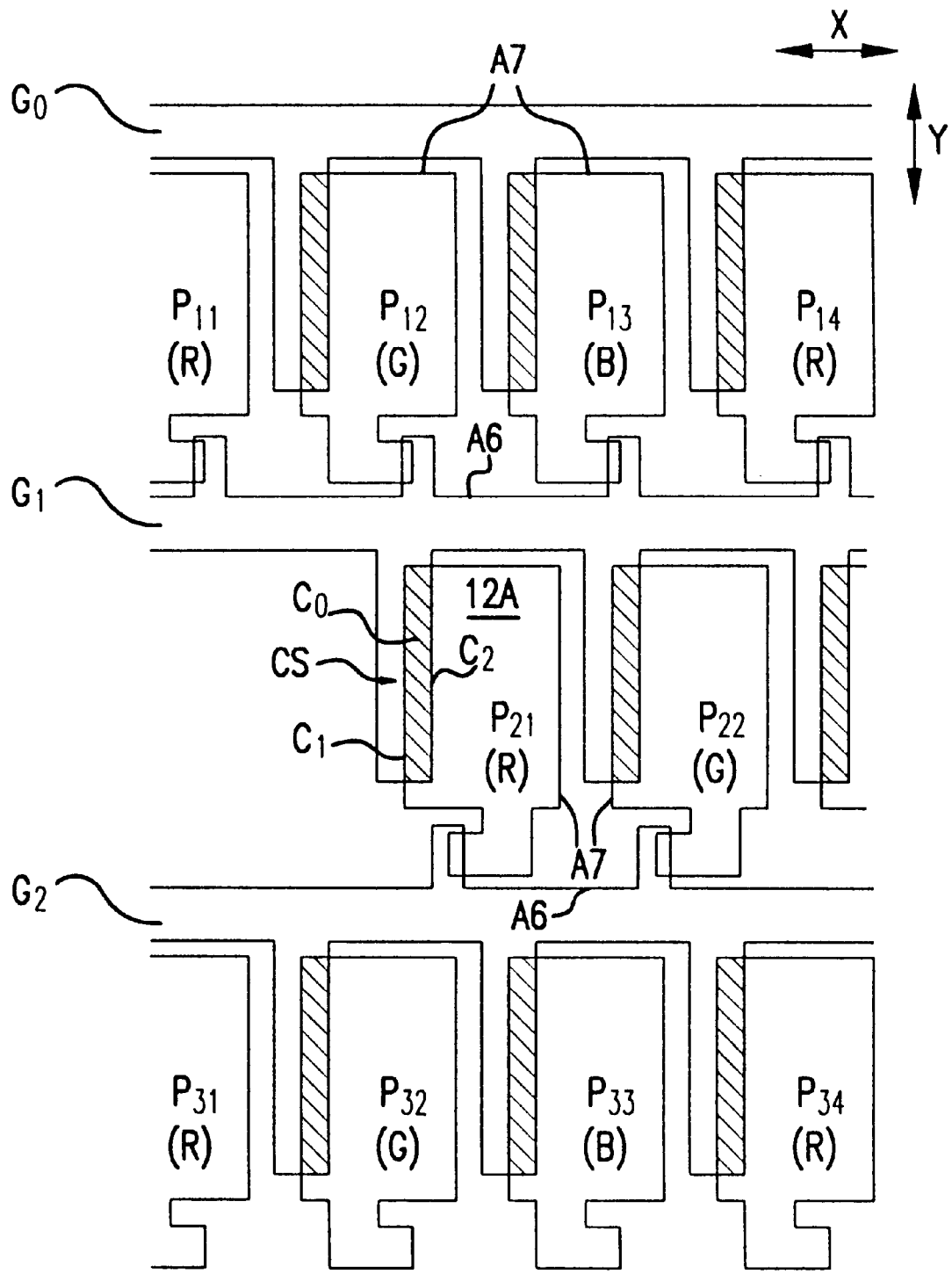
FIG. 10 is a plan view schematically showing the formation pattern of a tantalum film and an ITO film constituting the two electrodes of the storage capacitor on the substrate surface in the active matrix substrate shown in FIG. 9.

In this example, too, as in the first example, in the pixel regions P12, P22, P32, . . . along the source line S2 in the Y direction, for example, the storage capacitors CS are formed in the same position of the pixel regions. That is, although the first electrode C1 of the storage capacitor CS is formed at the end of the pixel electrode 12A unlike in the first example, the relative position of the first electrode C1 and the second electrode C2 projecting from the adjacent gate lines G0, G1, G2, . . . is set in such a way as to be the same in either the X direction or the Y direction among the pixel regions P11, P12, P13, . . . Accordingly, in FIG. 10, the overlap of the formation pattern A7 of the ITO film to constitute the pixel electrode 12A and the first electrode C1 of the storage capacitor CS, and the formation pattern A6 of the tantalum film to constitute the gate lines G1, G2, G3, . . . the gate electrode 113A and the second electrode C2 of the storage capacitor CS is patterned with oblique lines as facing portions C0 of the storage capacitors CS, even if the alignment is not obtained right and left (in the X direction) in forming the formation pattern A7 of the ITO film and the formation pattern A6 of the tantalum film, between the storage capacitor CS of the pixel regions P11, P12, . . . , P31, P32, . . . connected with the gate lines G1, G3, . . . at odd-numbered lines, and the storage capacitor CS of the pixel regions P21, P22, . . . connected with the gate lines G2 . . . , the area of the facing portions C0 (capacitance value of the storage capacitor CS) patterned with oblique lines is the same. As a result, this example has effects similar to the effects of the first example, such as the prevention of the occurrence of flickers in each gate line.

Note that although in this example, as in the first example, the adjacent gate lines G0, G1, G2, G3, . . . were used to constitute the second electrode C2, it is possible to form exclusive storage lines CM1, CM2, CM3, . . . and to use the lines to constitute the storage capacitors CS, as in the second example.

EXAMPLE 4

In the first to third examples, a liquid crystal display using a color filter according to the delta arrangement was realized, while in this example, a liquid crystal display using a color filter according to the mosaic arrangement was realized. In this example, since the color filter is arranged according to the mosaic arrangement, pixels are placed in a lattice-like shape. But because the other portions are the same as in the first example, the corresponding portions are given the same symbol and will not be explained in detail.

Figure 11:
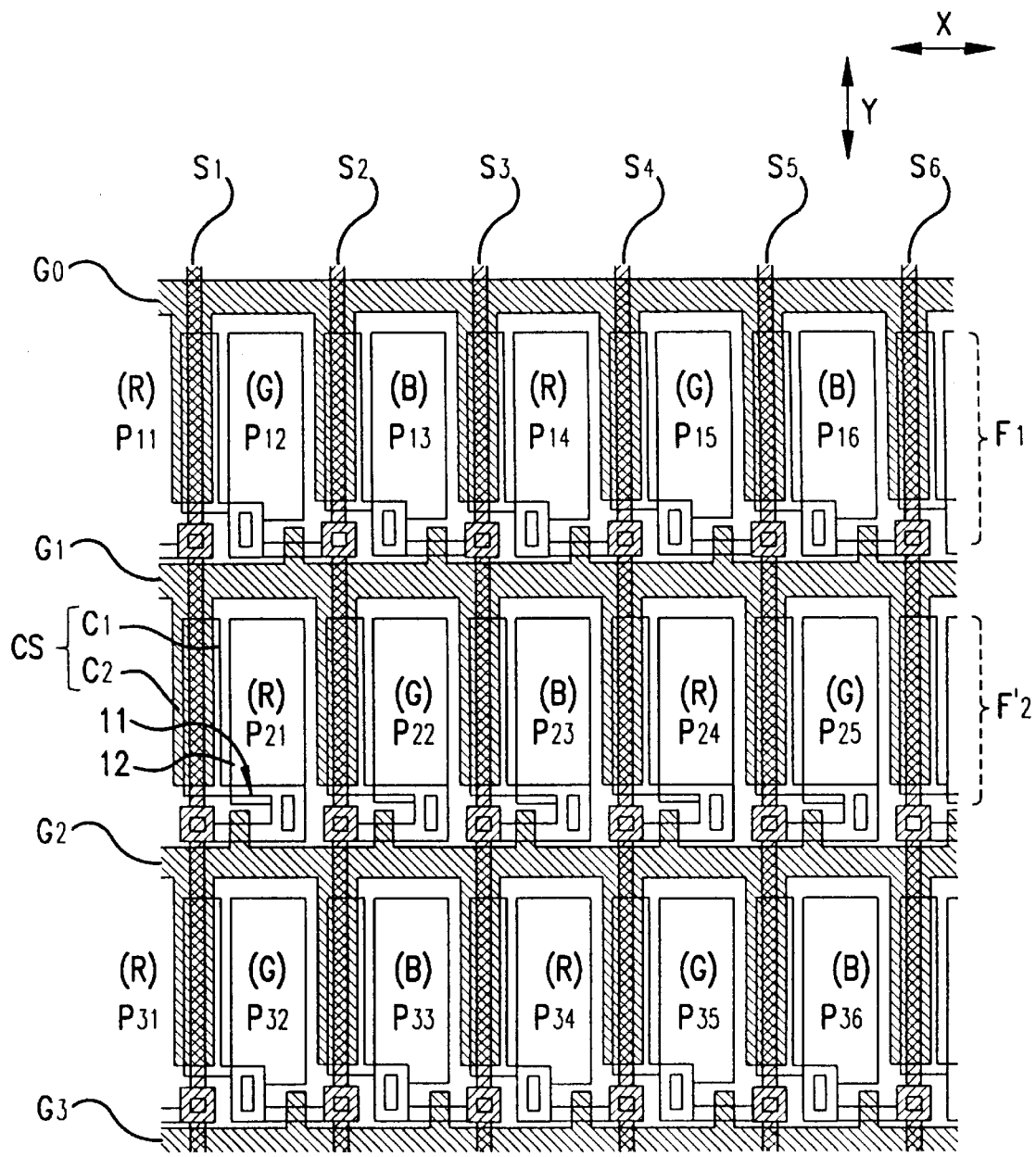
FIG. 11 is a plan view showing the formation pattern of each of the components of the active matrix substrate used in the liquid crystal display in the fourth example.

FIG. 11 shows the pattern of each of the components of the active matrix substrate in this example. On the surface of a transparent substrate are pixel regions P11, P12, P13, . . . corresponding to the intersections of gate lines G1, G2, G3, . . . running in the X direction, and source lines S1, S2, S3, . . . running in the Y direction. In these pixel regions P11, P12, P13, . . . a transparent pixel electrode 12 is connected with the source lines S1, S2, S3, . . . through a TFT 11 as a switching element. And in order to improve the storage characteristics of a liquid-crystal-capacitance portion CLC, a storage capacitor CS is formed between the adjacent gate lines G0, G1, G2, G3, . . . and the pixel electrode 12.

The structure described above is the same as in the first to third examples where the color filter 21 has the delta arrangement, but in this example, because the color filter 21 consisting of red R, green G, and blue B is formed according to the mosaic arrangement, the pixel regions P11, P12, P13, . . . are arranged in such a way as to correspond to the color filter 21 consisting of red R, green G, and blue B.

Figure 13:
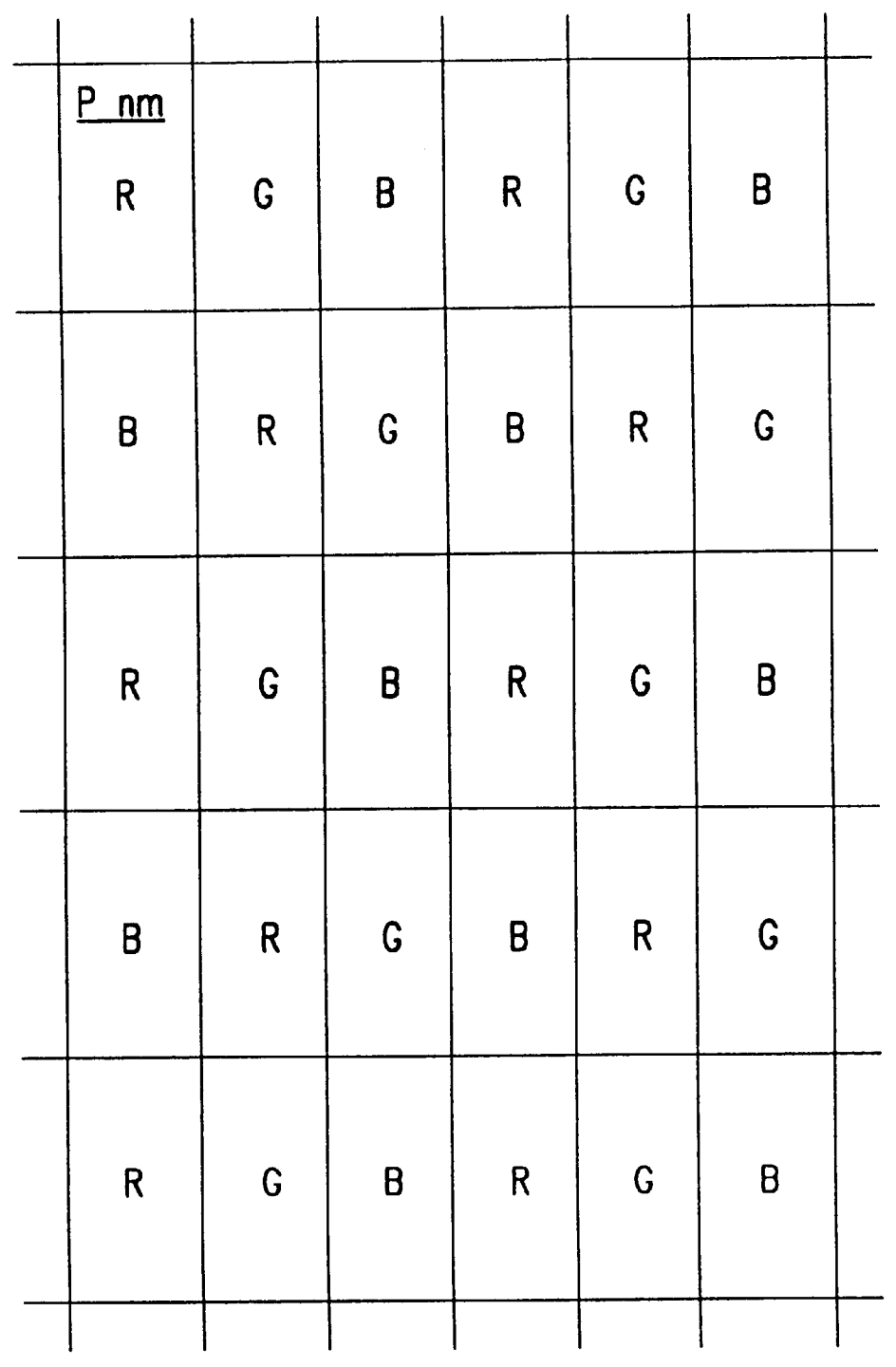

In FIG. 11, in each of the pixel regions P11, P12, P13, . . . , the color of the color filter to which each of the pixel regions corresponds is shown as (R), (G), or (B). A set of the three color filters of red, green and blue as one unit is, as shown in FIG. 13, arranged periodically in the X direction. A first color filter array F1 (color filter array at odd-numbered lines) and a second color filter array F2' (color filter array at even-numbered lines) are placed in such a way that each subsequent array is displaced by ⅓ of said one unit period in the X direction.

Corresponding to such an arrangement of the color filters, in the pixel regions P11, P12, P13, . . . connected with the gate line G1, the three pixel regions P11, P12 and P13 corresponding to the color filter 21 consisting of red R, green G, and blue B are repeatedly placed linearly in the X direction with the three pixel regions forming a single unit to form a first pixel array (pixel array at odd-numbered lines). And in a second pixel array (pixel array at even-numbered lines) consisting of pixel regions P21, P22, P23, . . . connected with the gate line G2, the three pixel regions P21, P22 and P23 corresponding to red R, green G, and blue B are repeatedly placed linearly in the X direction with the three pixel regions forming a single unit. The first pixel array (pixel array at odd-numbered lines) and the second pixel array (pixel array at even-numbered lines) are displaced from each other in the X direction by a ½ period when the pixel regions consisting of three colors corresponding to the color filter 21 consisting of red R, green G, and blue B are arranged periodically with the three pixel regions forming a single unit. As a result, the centers of the pixel regions P11, P12, P13, . . . are displaced from each other right and left by one pixel pitch at each line.

In the active matrix substrate constituted as described above, unlike in an active matrix substrate using the delta arrangement, even when only the pixel electrode of the pixel regions corresponding to the same color is connected with the same source line of the source lines S1, S2, S3, . . . , the source lines S1, S2, S3, . . . are formed in such a way as to run linearly in the Y direction between each of the pixel regions.

As in the first to third examples, the pixel electrode 12 of the pixel regions P12, P22, P32, . . . is connected with the same source line S2, for instance, alternately from right and left. Accordingly, as to the pixel regions P11, P12, P13, . . . in the X direction, the relative position of the TFT 11, the pixel electrode 12 and the storage capacitor CS (the first electrode C1 and the second electrode C2) is the same, while as to the pixel regions P12, P22, P32, . . . along the source line S2 in the Y direction, the relative position of the TFT 11 and the pixel electrode 12 is reversed right and left at each line.

The storage capacitors CS, however, are formed in the same relative position in any of the pixel regions. In other words, the relative position of the storage capacitors CS in the pixel regions is the same between the storage capacitors CS adjacent to each other in the Y direction.

Furthermore, the relative position of the first electrode C1 of the storage capacitors CS and the second electrode C2 projecting from the adjacent gate lines G0, G1, G2, . . . is the same either in the X direction or in the Y direction among the pixel regions P12, P22, P32, . . .

Accordingly, even if the alignment is not obtained right and left (in the X direction) or up and down (in the Y direction) in forming the first electrode C1 and the second electrode C2 of the storage capacitors CS, since the capacitance value of the storage capacitors CS is the same between the pixel regions P11, P12, P13, . . . corresponding to the gate lines G1, G3, . . . at odd-numbered lines, and the pixel regions P21, P22, P23, . . . corresponding to the gate lines G2, . . . at even-numbered lines, the active matrix substrate in this example has effects similar to the effects of the first example, such as the prevention of the occurrence of flickers in each gate line.

Note that although in this example, as in the first example, part of the adjacent gate lines G0, G1, G2, G3, . . . were used in the second electrode C2 of the storage capacitors CS, it is possible to form exclusive storage lines CM1, CM2, CM3, . . . and to use part of the lines in the second electrode C2 of the storage capacitors CS, as in the second example.

As the TFT 11, not only a coplanar TFT but also a reverse-stagger-type TFT may be used as in the third example.

OTHER EXAMPLES

The active matrix substrate according to the present invention can prevent the occurrence of flickers even if the alignment is not obtained, when used in a monochrome liquid crystal display just as when used in a color liquid crystal display.

Although a transparent ITO electrode was used in each of the examples, the present invention can also be applied to a reflective liquid crystal display using an aluminum electrode and others as a pixel electrode.

Furthermore, the present invention can be applied to an active matrix substrate in which, instead of a TFT, a diode with an MIM (Metal-Insulator-Metal) structure is used as a switching element. In other words, by making the relative position of the first electrode and the second electrode of the storage capacitors the same between the storage capacitors adjacent to each other in the Y direction, the active matrix substrate has effects similar to the effects of the first to fourth examples.

Industrial Applicability

As is clear from the foregoing discussion, according to the present invention, a first electrode and a second electrode constituting storage capacitors of the active matrix substrate can be overlapped by translating the electrodes among the pixel regions, that is, the relative position of the first electrode and the second electrode is the same among the pixel regions. Therefore, according to the present invention, the capacitance value of the storage capacitors is the same even if the alignment is not obtained in forming the first electrode and the second electrode. As a result, it is possible to equate the capacitance value of the storage capacitors between odd-numbered gate lines and even-numbered gate lines, and thereby to reduce flickers.

Although in the pixel regions, the formation position and the area of the first electrode and the second electrode are limited, according to the present invention, it becomes possible to prevent the occurrence of flickers caused when the alignment is not obtained in forming the first electrode and the second electrode only by optimizing the relative position of the first electrode and the second electrode. Therefore, the active matrix substrate according to the present invention is particularly advantageous to realize a liquid crystal display of high sophistication and high density.

Between the pixel regions corresponding to odd-numbered gate lines and the pixel regions corresponding to even-numbered gate lines, only the formation pattern of the first electrode differs and the pattern of the other components is substantially the same. Accordingly, even if the alignment is not obtained between the opposite substrate having color filters and the active matrix substrate, or on the active matrix substrate, there is no difference in the aperture rate between the pixel regions connected with the odd-numbered gate lines and the pixel regions connected with the even-numbered gate lines, and it is possible to effectively prevent nonuniformity of horizontal lines.

I claim:

1. A method of manufacturing a liquid crystal device comprising a plurality of gate lines, a plurality of source lines crossing the gate lines, a plurality of thin film transistors connected with the source lines and the gate lines, each of said thin film transistors electrically connected with a pixel electrode, the method comprising:

forming a thin silicon film on the substrate to form source regions and drain regions and first electrodes of storage capacitors, each of the storage capacitors electrically connected with a corresponding one of the pixel electrodes, forming gate insulating films on channel regions, and dielectric films on the first electrodes, forming gate electrodes on the gate insulating films and second electrodes of the storage capacitors on the dielectric films, forming interlayer insulating films on the gate electrodes and the second electrodes, forming source lines electrically connected to the source regions through contact holes, respectively, so as to overlap with the storage capacitors, forming pixel electrodes electrically connected to the drain regions through contact holes, wherein storage capacitors adjacent in two transverse directions are located along a same side of the corresponding pixel electrodes.

2. The method of claim 1, wherein the second electrodes are each electrically connected with one of a plurality of storage capacitance lines.

3. The method of claim 1, wherein each of the gate electrodes is electrically connected with one of the gate lines and each of the second electrodes is electrically connected with another one of the gate lines adjacent to the one of said gate lines.

* * * * *